US006783777B2

(12) United States Patent
Miller et al.

(10) Patent No.: US 6,783,777 B2
(45) Date of Patent: Aug. 31, 2004

(54) METHOD OF FEEDING SWINE

(75) Inventors: Bill L. Miller, Fort Dodge, IA (US); Brenda de Rodas, Fort Dodge, IA (US)

(73) Assignee: Land O'Lakes, Inc., Arden Hills, MN (US)

( * ) Notice: Subject to any disclaimer, the term of this patent is extended or adjusted under 35 U.S.C. 154(b) by 345 days.

(21) Appl. No.: 09/951,175

(22) Filed: Sep. 13, 2001

(65) Prior Publication Data

US 2003/0147991 A1 Aug. 7, 2003

(51) Int. Cl.$^7$ .............................. A23K 1/00; A23K 1/18
(52) U.S. Cl. ............................... 426/2; 426/53; 426/62; 426/623; 426/630; 426/635; 426/807
(58) Field of Search .............................. 426/2, 53, 62, 426/623, 630, 635, 807

(56) References Cited

U.S. PATENT DOCUMENTS

| | | | |
|---|---|---|---|
| 3,846,558 A | * 11/1974 | Stevens | 426/2 |
| 3,857,968 A | 12/1974 | Haas et al. | 426/33 |
| 3,968,255 A | 7/1976 | Haas et al. | 426/33 |
| 4,035,516 A | 7/1977 | Jungvid | 426/18 |
| 4,089,978 A | 5/1978 | Lugay et al. | 426/32 |
| 4,166,867 A | 9/1979 | Betz et al. | 426/73 |
| 4,167,584 A | * 9/1979 | Nelson | 426/2 |
| 4,190,679 A | 2/1980 | Coffee et al. | 426/623 |
| 4,391,829 A | 7/1983 | Spradlin et al. | 426/28 |
| 4,393,085 A | 7/1983 | Spradlin et al. | 426/28 |
| 4,623,541 A | 11/1986 | Elliot et al. | 424/85 |
| 4,713,250 A | 12/1987 | Tonyes et al. | 426/2 |
| 4,804,549 A | 2/1989 | Howley et al. | 426/98 |
| 4,888,185 A | 12/1989 | Miller | 426/72 |
| 4,994,284 A | 2/1991 | Miller | 426/74 |
| 5,053,234 A | 10/1991 | Anderson et al. | 426/59 |
| 5,100,679 A | 3/1992 | Delrue | 426/44 |
| 5,113,755 A | 5/1992 | Anderson et al. | 99/483 |
| 5,186,964 A | 2/1993 | Gierhart et al. | 426/74 |
| 5,192,804 A | 3/1993 | Blum et al. | 514/554 |
| 5,372,811 A | 12/1994 | Yoder | 424/94.6 |
| 5,431,927 A | 7/1995 | Hand et al. | 426/2 |
| 5,532,010 A | 7/1996 | Spanier et al. | 426/94 |
| 5,552,145 A | 9/1996 | Toride et al. | 424/245.1 |
| 5,575,999 A | 11/1996 | Yoder | 424/94.6 |
| 5,607,840 A | 3/1997 | Van Gorp et al. | 435/68.1 |
| 5,690,988 A | 11/1997 | Lin et al. | 426/635 |
| 6,030,649 A | 2/2000 | Sawhill et al. | 426/56 |
| 6,051,687 A | 4/2000 | Meeker et al. | 530/343 |
| 6,117,458 A | 9/2000 | Morgan | 426/2 |
| 6,203,843 B1 | 3/2001 | Remmereit | 426/630 |
| 6,254,910 B1 | 7/2001 | Paluch | 426/282 |
| 6,254,920 B1 | 7/2001 | Brunner | 426/656 |
| 2001/0002272 A1 | 5/2001 | Brunner | 426/656 |

FOREIGN PATENT DOCUMENTS

| | | | | |
|---|---|---|---|---|
| DE | 2602260 A | * | 8/1977 | |
| GB | 1572761 | * | 8/1980 | |
| WO | WO 88/06410 | | 9/1988 | A23K/1/18 |
| WO | WO 95/21540 | | 8/1995 | A23K/1/16 |
| WO | WO 97/27762 | | 8/1997 | A23K/1/16 |
| WO | WO 99/62355 | | 12/1999 | A23K/1/175 |
| WO | WO 00/10405 | | 3/2000 | A23K/1/00 |
| WO | WO 00/30456 | | 6/2000 | A21D/2/02 |
| WO | WO 00/41575 | | 7/2000 | A23K/1/18 |
| WO | WO 00/51442 | | 9/2000 | A23K/1/16 |

OTHER PUBLICATIONS

Griffin Industries, Pet Food Flavor Enhancers, 1 page, obtained from http://www.griffinind.com/html/flavorenhancers.html on May 22, 2001.

J. M. DeRouchey, M.D. et al.; Effects of Irradiation Processing of Speciality Protein Products on Nursery Pig Performance; Swine Day 2000; pp. 66–69; published in 2000, at the latest.

Nutra–Flo Protein Products brochure, PorSol$^R$ High–Quality Protein, 2000, 1 page.

Nutra–Flo Protein Products flyer. PorSol$^R$ High–Quality Protein, University Trials Show DPS is Your "Best Value", 1 page, 2000.

Nutra–Flo Company, PorSol$^R$ Product Specifications Sheet for DPS 30, 1 page, 2001.

Nutra–Flo Company, PorSol$^R$ Product Specifications sheet for DPS 5ORD, 1 page, 2001.

Nutra–Flo Company, PorSol$^R$ Technical Bulletin Number 41, Feeding Trial Performance Report, 1 page, 2000.

Nutra–Flo Company, PorSol$^R$ Technical Bulletin #16, Feeding Trial Performance Report, 2 pages, 2001.

Nutra–Flo Company, PorSol$^R$ Technical Bulletin #19, Feeding Trial Performance Report, 1 page, 2001.

Nutra–Flo Company, PorSol$^R$ Technical Bulletin #20, Feeding Trial Performance Report, 2 pages, 2001.

Nutra–Flo Company, PorSol$^R$ Technical Bulletin #42, Feeding Trial Performance Report, 3 pages, 2001.

Nutra–Flo Company, PorSol$^R$ Technical Bulletin #41, Feeding Trial Performance Report, 2 pages, 2001.

Nutra–Flo Company, PorSol$^R$ Technical Bulletin #38, Feeding Trial Performance Report, 1 page, 2001.

Nutra–Flo Company, PorSol$^R$ Technical Bulletin #37, Feeding Trial Performance Report, 3 pages, 2001.

Nutra–Flo Company, PorSol$^R$ Technical Bulletin #32, Feeding Trial Performance Report, 3 pages, 2001.

Nutra–Flo Company, PorSol$^R$ Technical Bulletin #31, Feeding Trial Performance Report, 2 pages, 2001.

Nutra–Flo Company, PorSol$^R$ Product Specifications sheet for DPS 40, 1 page, 2001.

Nutra–Flo Company, CPS–ULTRA 23 Specification Sheet, PorSol®, 2 pages, 2001.

(List continued on next page.)

Primary Examiner—C. Sayala
(74) Attorney, Agent, or Firm—Westman, Champlin & Kelly, P.A.

(57) ABSTRACT

A method of feeding young, weaned swine, that includes applying a liquid digest onto a feed substance to form a feed material, the liquid digest including an enzymatically-processed material, and providing the feed material to the young, weaned swine.

43 Claims, No Drawings

OTHER PUBLICATIONS

Nutra–Flo Company, Material Safety Data Sheet on Condensed Porcine Soluble (CPS), Oct. 18, 1999, 5 pages.
Nutra–Flo Company, Material Safety Data Sheet on CPS–ULTRA 23, May 10, 2000, 6 pages.
Nutra–Flo Company, Material Safety Data Sheet on Dried Porcine Solubles (DPS 30), Feb. 21, 2001, 6 pages.
Nutra–Flo Company, Material Safety Data Sheet on DPS 5ORD (Dried Porcine Solubles), Feb. 21, 2001, 5 pages.
Nutra–Flo Company, Material Safety Data Sheet on Dried Porcine Solubles (DPS 40), Feb. 21, 2001, 5 pages.
Nutra–Flo Company, The Feed Bag: PorSol$^R$ Newsletter, Issue No. 5, 2001, 2 pages.
Nutra–Flo Company, Past Articles from The Feed Bag: PorSol® Newsletter, 2001, 3 pages.
Nutra–Flo Company, PorSol$^R$ Technical Bulletin #3, Feeding Trial Performance Report, 2 pages, 2001.
Nutra–Flo Company, PorSol$^R$ Technical Bulletin #9 , Feeding Trial Performance Report, 2 pages, 2001.
Nutra–Flo Company, PorSol$^R$ Technical Bulletin #11, Feeding Trial Performance Report, 2 pages, 2001.
Nutra–Flo Company, PorSol$^R$ Technical Bulletin #13, Feeding Trial Performance Report, 2 pages, 2001.
American Dehydrated Foods, Inc.—Corporate Profile, 1 page 1997.
American Dehydrated Foods, Inc., Product Specification on Liquid Digest for Dogs, Mar. 9, 2000, 1 page.
American Dehydrated Foods Inc., "Temporary" Product Specification on Liquid Ocean Fish Digest, Feb. 29, 2000, 1 page.
American Dehydrated Foods, Inc., Product Specification on Natural Chicken Flavor, Feb. 29, 2000, 1 page.
American Dehydrated Foods Inc., Product Specification on Natural Crab Flavor, Jun. 9, 2000, 1 page.
American Dehydrated Foods Inc., Product Specification on Spray Poultry Digest, Feb. 29, 2000, 1 page.
Dennis L. Gierhart, PhD, Palatability Competitive advantages, Pet Food Industry, Mar.–Apr. 1991, 4 pages.
Digest and Its Use in Pet Foods, The Iams Company, 2000, 3 pages.
Marshall H. Jurgens, Ph.D., Performance of Weanling Pigs Fed Diets Containing Yeast Culture and/or an Antibiotic; from the 1995 Research Investment Report, 3 pages, 1995.
Abstract entitled: *Evaluation of Dried Porcine Solubles (DPS) Feed Ingredients for Weaning Pigs*, J. Anim. Sci. vol. 76, Suppl. I/J. Dairy Sci. vol. 81, Suppl. Jan. 1998, 1 page.

* cited by examiner

METHOD OF FEEDING SWINE

CROSS-REFERENCE TO RELATED APPLICATION(S)

None.

BACKGROUND OF THE INVENTION

The present invention generally relates to a method of enhancing feed consumption. More particularly, the present invention relates to a method for enhancing feed consumption by swine, especially by young, post-weaned piglets and lactating sows.

The economic viability of a pork producer is directly related to the number of litters the producer's sows have and the number of piglets in each litter of each sow. Other important factors in the economic viability of pork production include how quickly and efficiently young pigs reach a marketable weight.

Lactating sows typically do not consume enough feed during lactation to maintain body weight. There is a strong correlation between body weight loss by sows during lactation and the interval between weaning and return to estrus for the sows. Additionally, weight loss by sows during lactation and subsequent litter sizes produced by the sows are negatively correlated. These two correlations have a significant economic impact on pork producers. First, sows that lose a substantial amount of weight during lactation are typically not able to have as many litters during the reproductively viable period of the sows. Besides reducing the number of litters a sow is able to have, substantial weight loss by the sows during lactation will typically reduce the number of piglets in subsequent litters that the sows produce. Therefore, feeds with enhanced palatability that increase feed intake and maintain sow body weight during lactation are extremely valuable to pork producers.

Another factor in the economics of producing pork is the time required to raise pigs following weaning to a marketable weight. The process of weaning, especially "early weaning" which is defined herein to be "between 10 and 18 days of age," produces challenges that the young pigs have not previously experienced. These challenges include, among other things, an abrupt change in diet, usually from sow's milk to grain-based feeds. During the post-weaning period, pigs typically have a limited opportunity to digest anything but sow's milk before being abruptly introduced to feed other than sow's milk, such as grain-based feeds. Besides being unfamiliar with the new feed, the young pigs must also adapt to a new social structure where the pigs are not solely reliant on their sows for nourishment. When these two circumstances occur simultaneously, nutritional intake by the young pigs is typically disrupted, which may reduce the growth rate of the young pigs and also may increase the mortality rate of the young, post-weaned pigs.

A number of feed additives have been employed as feed supplements for young pigs. For example, one type of feed additive for young pigs includes a protein hydrolysate that is derived from processing of porcine mucosa and intestinal portions. Nonetheless, despite the advances in the art of feeding animals represented by these approaches, a need still remains for a feeding approach and composition that minimizes the deleterious effects that may be exhibited when weaning young pigs from sow's milk to a feed other than sow's milk, such as grain-based feeds. Furthermore, a need remains for a feeding approach and composition that will encourage post-weaned pigs to maximize their daily feed intake and that will increase growth and weight gain of post-weaned pigs beyond that previously exhibited upon weaning young pigs from sow's milk to a different diet, such as a diet that includes grain-based feeds. The feeding approach and composition of the present invention provides a solution to this outstanding need that will enhance the economic viability of pork producers.

BRIEF SUMMARY OF THE INVENTION

The present invention includes a method of feeding young, weaned swine. The method includes applying a liquid digest onto a feed substance to form a feed material, where the liquid digest includes an enzymatically-processed material, and providing the feed material to the young, weaned swine. The present invention further includes a method of increasing the palatability of a swine feed, a method of making a swine feed, method of increasing the feed efficiency of a young post-weaned pig, a method of increasing the feed intake of a lactating sow, and a method of maintaining the body weight of a lactating sow.

DETAILED DESCRIPTION

The present invention includes both a method for enhancing the amount of average daily intake of feed by post-weaned piglets and also a method of minimizing weight loss by lactating sows. The method of the present invention generally entails coating a swine feed with a liquid digest produced by an enzymatic reaction that digests and liquefies a nutritional component, such as a protein substrate and/or a carbohydrate substrate.

It has been discovered that applying a liquid digest in an effective amount to a swine feed increases the average daily feed intake and average daily weight gain of young, post-weaned pigs, as compared to the average daily feed intake and average daily weight gain of young post-weaned pigs fed only the swine feed that is free of the liquid digest application. Thus, the liquid digest, when applied to the swine feed in accordance with the present invention, acts as a palatability enhancer of the swine feed. Furthermore, application of the liquid digest in an effective amount to the swine feed surprisingly has been discovered to increase the feed efficiency, and consequently decrease the ratio of feed consumption to weight gain, of the young, post-weaned pigs, as compared to the feed efficiency, and consequently the ratio of feed consumption to weight gain, of young post-weaned pigs fed only the swine feed that is free of the liquid digest application.

The liquid digest may be applied to the swine feed at any rate that is effective to realize advantages of the present invention. For example, the liquid digest maybe generally applied to the swine feed at a rate ranging from above about 0 pounds to about 3 pounds of the liquid digest per one hundred (100) pounds of the swine feed, and preferably at a rate ranging from about 1 pounds to about 3 pounds of the liquid digest per one hundred (100) pounds of the swine feed, such as at the rate of about 2 pounds of the liquid digest per one hundred (100) pounds of swine feed. Nonetheless, in accordance with the present invention, the liquid digest may generally be applied to the swine feed at any effective rate that may generally range from above about 0 pounds to above about 3 pounds, such as to at least about 20 pounds or more, of the liquid digest per one hundred (100) pounds of swine feed.

In the context of the average daily feed intake of young, post-weaned pigs, the effective amount of the liquid digest is the amount of the liquid digest that, when applied to the swine feed, brings about an increase of the average daily feed intake of the young, post-weaned pigs, as compared to the average daily feed intake of the young post-weaned pigs fed only the swine feed that is free of the liquid digest application. In the context of the average daily weight gain of young, post-weaned pigs, the effective amount of the liquid digest is the amount of the liquid digest that, when applied to the swine feed, brings about an increase of the average daily weight gain of the young, post-weaned pigs, as compared to the average daily weight gain of the young post-weaned pigs fed only the swine feed that is free of the liquid digest application. In the context of the feed consumption to weight gain ratio, the effective amount of the liquid digest is the amount of the liquid digest that, when applied to the swine feed, brings about a decrease of the feed consumption to weight gain ratio of the young, post-weaned pigs, as compared to the feed consumption to weight gain ratio of the young post-weaned pigs fed only the swine feed that is free of the liquid digest application.

Preferably, the liquid digest is applied to the swine feed in an amount that is effective to increase the average daily feed intake of the young, post-weaned pigs, as compared to the average daily feed intake of young post-weaned pigs fed only the swine feed that is free of the liquid digest application, by at least about 15%, and more preferably by at least about 25%, over a period of at least about seven days, and more preferably over a period of at least about two weeks. Likewise, the liquid digest is preferably applied to the swine feed in an amount that is effective to increase the average daily gain of the young, post-weaned pigs, as compared to the average daily gain of young post-weaned pigs fed only the swine feed that is free of the liquid digest application, by at least about 10%, more preferably by at least about 15%, and still more preferably by at least about 25%, over a period of at least about seven days, and more preferably over a period of at least about two weeks. Furthermore, the liquid digest is preferably applied to the swine feed in an amount that is effective to decrease the feed consumption to weight gain ratio of the young, post-weaned pigs, as compared to the feed consumption to weight gain ratio of young post-weaned pigs fed only the swine feed that is free of the liquid digest application, by at least about 4%, and more preferably by at least about 8%, over a period of at least about seven days, and more preferably over a period of at least about two weeks.

Besides being useful as a palatability enhancer for increasing the feed intake of young, post-weaned pigs, application of the liquid digest to swine feed is also surprisingly useful as a palatability enhanced for helping minimize weight loss by lactating sows or even maintaining the body weight of lactating sows. It is known that lactating sows have difficulty maintaining body weight while nursing pigs. Nonetheless, it has been found that coating swine feed with liquid digest in accordance with the present invention causes the sow to consume more swine feed, apparently by virtue of enhancing the palatability of the feed, and thereby helps the sow maintain body weight during lactation. Furthermore, application of the liquid digest to swine feed causes lactating sows that consume the swine feed with the applied liquid digest to exhibit significantly thicker backfat, as compared to lactating sows that consume only swine feed that is free of applied liquid digest.

In the context of the average daily feed intake of lactating sows, the effective amount of the liquid digest is the amount of the liquid digest that, when applied to the swine feed, brings about an increase of the average daily feed intake of the lactating sows, as compared to the average daily feed intake of lactating sows fed only the swine feed that is free of the liquid digest application. In the context of weight maintenance by lactating sows, the effective amount of the liquid digest is the amount of the liquid digest that, when applied to the swine feed, allows an increase of the body weight of the lactating sows, or at least less body weight loss by the lactating sows, as compared to the body weight lost by lactating sows fed only the swine feed that is free of the liquid digest application.

Preferably, the liquid digest is applied to the swine feed in an amount that is effective to increase the average daily feed intake of lactating sows, as compared to the average daily feed intake of lactating sows fed only the swine feed that is free of the liquid digest application, by at least about 5%, and more preferably by at least about 10%, over a period of at least about seven days, and more preferably over a period of at least about two weeks. As another alternative, the liquid digest is preferably applied to the swine feed in an amount that is effective to increase the average daily feed intake of lactating sows, as compared to the average daily feed intake of lactating sows fed only the swine feed that is free of the liquid digest application, by at least about 8% over the entire lactation period of the lactating sows beginning at farrowing and ending at weaning of the piglets.

Likewise, the liquid digest is preferably applied to the swine feed in an amount that is effective to allow lactating sows to either lose no body weight or to at least lose less weight, as compared to the weight lost by lactating sows fed only the swine feed that is free of the liquid digest application, over a period of about one week, and more preferably over a period of at least about two weeks, when the sows are lactating following weaning. Furthermore, the liquid digest is preferably applied to the swine feed in an amount that is effective to cause the backfat thickness of the lactating sows to be about 40% greater, as of the end of lactation, than the backfat thickness of lactating sows fed only the swine feed that is free of the liquid digest.

The liquid digest may be based upon natural nutritional components, such as a proteinaceous material, a fatty material, a carbohydrate-containing material, or any combination of any of these., that are preferably derived from animal tissue. The natural nutritional components yield natural flavors to the liquid digest. Lipids and fatty acids are some non-exhaustive examples of fatty materials that may be derived from animal tissue. Saccharides, such as simple sugars, and polysaccharides, such as glycogen, are some non-exhaustive examples of carbohydrate-containing materials that may be derived from animal tissue.

Through an enzymatic process, the nutritional components are reduced in size, with the nutritional components preferably being reduced in size sufficiently to liquify, or at least essentially liquify, the nutritional components. Thus, enzymatic processing reduces proteinaceous materials to smaller peptides and amino acids. Likewise, enzymatic processing breaks fatty materials into smaller particles, such as smaller lipids and smaller fatty acids. Also, enzymatic processing breaks carbohydrates into smaller compounds with shorter chain lengths. As the enzymatic reaction progresses, the proteinaceous materials, fatty materials, and carbohydrate-containing materials are reduced in size to the point where the proteinaceous materials, fatty materials, and carbohydrate-containing materials are preferably liquified, or at least essentially liquified.

Thus, the liquid digest includes enzymatically-processed materials that are preferably derived from animal tissue, such as proteinaceous materials that have been enzymatically-processed, fatty materials that face been enzymatically processed, carbohydrate-containing materials that have been enzymatically-processed, and any combination of any proteinaceous materials, any fatty materials, and any carbohydrate-containing materials that have been enzymatically-processed. Some more specific examples of components of the liquid digest include, but are not limited to, enzymatically-processed chicken by-products, enzymatically-processed chicken meat, enzymatically-processed chicken liver, enzymatically-processed fish meat, enzymatically-processed fish by-products, enzymatically-processed beef, enzymatically-processed beef by-products, enzymatically-processed dairy materials, enzymatically-processed yeast, and any of these in any combination.

Some non-exhaustive examples of dairy materials that may be enzymatically processed and thereafter incorporated in the liquid digest include dried buttermilk, dried skimmed milk, dried whole whey, casein and cheese rind. Some non-exhaustive examples of yeast that may be enzymatically processed and thereafter incorporated in the liquid digest include distillers' dried yeast, primary dried yeast, irradiated dried yeast, brewers dried yeast and torula dried yeast.

As used herein, the term "meat" is refers to the flesh of a mammal, such as cattle, swine, sheep and goats; poultry, such as chickens, turkeys, ducks, and geese; and seafood, such as fish and shellfish. Additionally, as used herein, the term "meat by-product" is intended to refer non-rendered parts from slaughtered or harvested animals, such as mammals, poultry, and seafood. Beyond enzymatically-processed components, the liquid digest may optionally include crab paste; fish paste; fish oil; phosphoric acid; any edible antimycotic substance(s), such as calcium propionate and potassium sorbate; any edible natural antioxidant(s), vitamins; minerals; and any of these in any combination.

Natural nutritional components, such as proteinaceous materials, fatty materials, carbohydrate-containing materials, and combinations of the se may be enzymatically-processed in preparation for incorporation in liquid digest by combining the natural nutritional component(s) with suitable enzyme(s) under suitable enzymatic reaction conditions. Selection of suitable enzyme(s) and suitable enzymatic reaction conditions for enzymatic processing of natural nutritional component(s) is within the knowledge of those of ordinary skill in the art of the enzymatic processing industry.

As an alternative to extraneous enzymes that are added, some animal components, such as chicken viscera, contain self-produced enzymes and are capable of autolyzing (self-digesting) when placed under suitable reaction conditions. The liquid digest of the present invention may permissibly incorporate autolysates, natural nutritional components that have been enzymatically processed by addition of extraneous enzymes, or any combination of any of these. In one preferred embodiment, the liquid digest of the present invention incorporates both natural nutritional components that have been enzymatically processed by addition of extraneous enzymes and one or more natural nutritional components that have been enzymatically processed by self-produced enzymes (i.e., autolysates).

Some non-exhaustive examples of suitable liquid digests are liquid digests that are available from American Dehydrated Foods, Inc. of Springfield, Mo. Some examples of suitable liquid digests that are available from American Dehydrated Foods, Inc. include natural chicken flavor liquid digest (product code no. 040520), natural chicken liquid digest with crab flavor (product code no. 041220), liquid digest for dogs (product code no. 040120), and liquid ocean fish digest (product code no. 050420). Some representative component ranges (all ranges are approximate) for these four particular liquid digest of American Dehydrated foods, Inc. are provided in Table 1 below:

TABLE 1

| Variable | NATURAL CHICKEN FLAVOR LIQUID DIGEST | NATURAL CHICKEN LIQUID DIGEST WITH CRAB FLAVOR | LIQUID DIGEST FOR DOGS | LIQUID OCEAN FISH DIGEST |
| --- | --- | --- | --- | --- |
| Product Code No. | 040520 | 041220 | 040120 | 050420 |
| Moisture (wt %) | 62 to 72 | 62 to 72 | 66 to 77 | 66 to 76 |
| Fat (wt %) | 13 to 21 | 13 to 21 | 6 to 11 | 4 to 7 |
| Crude Protein (wt %) | 7 to 15 | 7 to 15 | 12 to 17 | 12 to 18 |
| Ash (wt %) | 2.5 to 6.5 | 2.5 to 6.5 | 4 to 9 | 3 to 7 |

The natural chicken flavor liquid digest is enzymatically derived from chicken by-products and also contains phosphoric acid, calcium propionate and natural antioxidants. The natural chicken with crab flavor liquid digest is enzymatically derived from chicken by-products and also contains crab paste, phosphoric acid, calcium propionate and natural antioxidants. The liquid digest for dogs is enzymatically derived from chicken liver, chicken meat, and brewer's yeast and also contains phosphoric acid, calcium propionate and natural antioxidants. Finally, the liquid ocean fish digest is enzymatically derived from fish and dairy whey and also contains phosphoric acid, potassium sorbate, and natural antioxidants.

The swine feed to which the liquid digest may be applied in accordance with the present invention may take any form that is capable of accepting an application of the liquid digest. Thus, as some non-exhaustive examples, the swine feed may be any dry swine feed, such as any commercially available or proprietary dry swine feed, or a semi-solid swine feed that contains more moisture than dry swine feed. The outer surface of the swine feed may have any texture and may generally range from a hard outer surface to a soft outer surface. As some non-exhaustive examples, the swine feed may have a pelleted, chunk, granular, particulate, flaked, meal, or powdered form, or any combination of these or similar forms.

The method of preparing the swine feed to include the liquid digest preferably includes the following steps. First, prior to applying the liquid digest the swine feed, the liquid digest is preferably heated to an application temperature. The application temperature is preferably warm enough to allow the liquid digest to be easily applied to the swine feed by the chosen application technique. The application temperature may generally be room temperature, such as about 70° F., or higher, but preferably ranges about 100° F. to about 120° F. The liquid digest that has preferably been heated may then be applied to the swine feed at any effective rate to coat the swine feed with the liquid digest. The liquid digest may be applied to the swine feed in any conventional fashion that is effective to coat the swine feed with the liquid digest, such as by spraying the liquid digest onto the swine feed, brushing the swine feed with the liquid digest, dipping the swine feed in the liquid digest, tumbling the swine feed with the liquid digest, or any combination of any of these. Preferably, the liquid digest is sprayed onto the swine feed, such as with a conventional hand-held liquid sprayer. The feed coated with the liquid digest is then preferably allowed to dry before the liquid-digest-coated swine feed is fed to pigs, such as young, post-weaned pigs or lactating sows.

In the examples that are provided below as some non-exhaustive illustrations of various aspects of the present invention, feeding periods for young, weaned piglets are variously characterized in phases, such as Phase 1, Phase 2, and Phase 3. This characterization in terms of phases is generally consistent with feeding period characterizations employed in the swine industry for young, weaned piglet. In the swine industry, Phase 1 may be characterized as a feeding period for young, weaned piglets with a body weight generally ranging from about ten to about fifteen and a half pounds. During the Phase 1 feeding period, young, weaned piglets will often consume, as an average, on the order of about 0.4 to about 0.6 pounds of feed daily. In the examples provided herein, Phase 1 began immediately after the young pigs were weaned from the sows and lasted from about seven to about eight days.

Likewise, in the swine industry, Phase 2 may be characterized as a feeding period for young, weaned piglets with a body weight generally ranging from about fifteen and a half pounds to about thirty pounds. During the Phase 2 feeding period, young, weaned piglets will often consume, as an average, on the order of about 0.8 to about 1.3 pounds of feed daily. In the examples provided herein, Phase 2 began immediately after Phase 1 ended and lasted from about eight days to about fourteen days. Similarly, in the swine industry, Phase 3 may be characterized as a feeding period for young, weaned piglets with a body weight generally ranging from about thirty pounds to about fifty-five pounds. During the Phase 3 feeding period, young, weaned piglets will often consume, as an average, on the order of about two pounds to about two and a half pounds of feed daily. In the examples provided herein, Phase 3 began immediately after Phase 2 ended and lasted about ten to about fourteen days.

It is believed that the feed coated with the liquid digest and fed to pigs in accordance with the present invention increases the palatability of the pig feed. This apparent increase in palatability results in increased daily feed intake by the pigs, an increased average daily gain by young post-weaned piglets, and better maintenance of weight by lactating sows. The described palatability enhancement, increased feed intake, and increased average daily weight gain, in the context of young, weaned pigs, have, as illustrated in the examples that follow, been observed during Phase 2 feeding period testing of young, weaned pigs. Further realization of the described benefits, in the context of young, weaned pigs, is expected to occur upon incorporation of the liquid digest feeding regimen of the present invention during the Phase 3 feeding period for young, weaned pigs.

The present invention is more particularly described in the following examples that are intended as illustrations only, since numerous modifications and variations within the scope of the present invention will be apparent to those skilled in the art.

EXAMPLES

In these examples, statistical analysis is provided for comparing the results of feeding test pigs the control feeds coated with liquid digest versus the results of feeding the test pigs the control feeds that have not been coated with liquid digest. Each test pig included in these examples received routine care and management consistent with appropriate recommendations in the *Guide for the Care and Use of Agricultural Animals in Agricultural Research and Teaching* (1st edition, March 1988). In each of Examples 1–7 below, the control feed had the composition set forth in Table 2 below:

TABLE 2

| COMPONENT DETAILS | CONTROL FEED (WEIGHT %)[a] |
|---|---|
| Corn/oats | 48.56 |
| Vegetable Protein | 25.60 |
| Milk-based components (such as whey) | 15.30 |
| Animal protein | 6.00 |
| Fat | 2.25 |
| Minerals and Vitamins | 1.90 |
| Antibiotics | 0.25 |
| Other (such as colorants and preservatives) | 0.14 |
| Other Details | |
| Energy Content {ME} (Kcal/lb) | 1556 |
| Crude Protein (weight %) | 20.68 |
| Lysine (weight %) | 1.30 |
| Calcium (weight %) | 0.90 |
| Phosphorous (weight %) | 0.70 |

[a]based upon the total weight of the control feed

A probability value (P) may be calculated for comparing between mean variable values for groups of pigs fed the control feed alone (excludes the liquid digest coating) versus mean variable values for groups of pigs fed the control feed coated with the liquid digest for a particular variable in a particular feeding trial. The probability value, P, is a measure of the statistical probability that the differing mean variable values between the groups of pigs fed the control feed and the pigs fed the control feed coated with the liquid digest may be explained by the difference between feeding the control feed coated with the liquid digest versus feeding the control feed that excludes the liquid digest coating.

A P value of 0.10 means that 10 times out of 100, the results can be explained by factors other than the addition of the liquid digest coating to the control feed. For purposes of comparing data in this document, P values of 0.10, or lower, are considered to be statistically significant. Thus, where a P value of 0.10 or less is returned for particular results, it is assumed that the differing results are fully explained by the test regimen, i.e.: the feeding of a digest coating on the feed versus the lack of a digest coating on the feed.

Also, many of the tables in this application include a coefficient variation (CV) for data in a particular row. A coefficient of variation is simply the standard deviation of a particular variable that is divided by the mean of the variable and then multiplied by 100. Because variances of standard deviations are used to measure error, and because these values for variances in standard deviations are sensitive to the absolute scale of the variable, coefficients of variation are provided, since the coefficients of variation remove the influence of the overall magnitude of the data. A lower coefficient of variation corresponds to data with a lower variation.

Average daily feed intake (also referred to as "ADFI") of a an individual pig or of a group of pigs may be determined by first subtracting the amount of feed remaining at the end of the test period from the amount of feed present at the start of the test period to determine the total consumption of feed during the test period. The total consumption of feed during the test period is divided by the number of days during which the feed is available to the pig(s) and by the number of pig(s) to determine the average daily feed intake per pig. An alternative method of calculating ADFI is to individually determine the amount of feed consumed by the pig(s) on each day of the test period and divide the total consumption by the number of days in the feed trial and by the number of pigs in the feed trial.

The average daily gain (also referred to as "ADG") of an individual pig or of a group of pigs may be determined by subtracting the total weight of the pig(s) at the start of the measurement period from the total weight of the pig(s) at the end of the measurement period. The total weight gain is then divided by the number of days in the test period and by the total number of pig(s) fed during the measurement period to determine the average daily gain, per pig, during the measurement period. Alternatively, ADG may be determined by weighing the pig(s) at the start and at the end of each day to determine daily weight gain and by then dividing the sum of the daily gain by the number of days in the measurement period and by the total number of pig(s) fed during the measurement period.

The feed to gain ratio (feed:gain) of an individual pig or of a group of pigs during a particular measurement period may be determined by dividing the total weight of feed consumed by the pig(s) by the total weight gained by the pig(s) during the measurement period. The smaller the calculated ratio of feed to gain is, the more efficiently the feed is being processed by the pig(s) and converted to weight gain.

Example 1

Example 1 demonstrates that post-weaned pigs prefer the control feed that includes a coating of the liquid digest over the control feed that does not include a coating of the liquid digest. In Phase 1 of this example, twenty four (24) newly-weaned pig (i.e., weanling) that were 21 days old, on average, were randomly assigned to individual pens in a conventional heated nursery. In the nursery, each pig was housed in the individual pens, separately from any other pig. The nursery was maintained at 85° F. during the first week (days 0–7) of this example, and was decreased by 3° F. each week thereafter, starting with day 8 of this example.

During Phase 1 of this example, which lasted for seven days, the twenty-four pigs were fed a common commercially available piglet nursery diet. At the end of Phase 1, and the start of Phase 2, the twenty-four pigs were randomly assigned to either a Trial A or a Trial B of Phase 2. Twelve of the twenty-four pigs were assigned to Trial A, and the other twelve of the twenty-four pigs were assigned to Trial B. Phase 2 lasted for eight days. Thus, Phase 1 ran from day 0 to day 7, and Phase 2 ran from day 8 to day 15 of this example, where day 0 was the day the twenty-four piglets were weaned from their sows.

One purpose of splitting the twenty-four different pigs between Trial A and Trial B was to evaluate the preference of the pigs for the control feed that was free of liquid digest versus the combination of the control feed and the liquid digest, where different liquid digests were used in Trial A and in Trial B. In Trial A, the liquid digest was natural chicken liquid digest with crab flavor (product code no. 041220) that was obtained from American Dehydrated Foods, Inc. of Springfield, Mo. In Trial B, the liquid digest was liquid digest for dogs (product code no. 040120) that was obtained from American Dehydrated Foods, Inc. The same control feed was used in both Trial A and Trial B.

In Trial A, from day 8 through day 15, each of the pigs in the twelve individual pens had equal ad libitum access to water and to both the control feed and to the control feed coated with the liquid digest used in Trial A. In Trial A, the liquid digest, when used, was sprayed onto the control feed at the rate of about 2 pounds of the liquid digest per one hundred (100) pounds of the control feed using a conventional hand operated sprayer. The control feed in Trial A was in pellet form. Prior to applying the liquid digest to the control feed, the liquid digest was heated to a temperature ranging from about 100° F. to about 120° F.

In Trial B, from day 8 through day 15, each of the pigs in the twelve individual pens had equal ad libitum access to water and to both the control feed and to the control feed coated with the liquid digest used in Trial B. In Trial B, the liquid digest, when used, was sprayed onto the control feed at the rate of about 2 pounds of the liquid digest per one hundred (100) pounds of the control feed using a conventional hand operated sprayer. The control feed in Trial B was in pellet form. Prior to applying the liquid digest to the control feed, the liquid digest was heated to a temperature ranging from about 100° F. to about 120° F.

In both Trial A and Trial B, each individual pen contained a nipple water drinker and a two-hole feeder for the two different test feeds. The two feeders were each labeled for the respective diet that each one contained, and the location of each feeder was shifted daily to eliminate any bias as to the location of the feeder. Feed consumption for each different feed for each of the different pigs was recorded daily during Phase 2 in both Trial A and Trial B.

In Trial A and Trial B, the weight of each young pig was measured and individually recorded daily. The average weight of the twelve pigs of Trial A on Day 0 and on Day 7 of Phase 1 and on Day 15 of Phase 2 was calculated from this individual pig weight data. Likewise, the average weight of the twelve pigs of Trial B on Day 0 and on Day 7 of Phase 1 and on Day 15 of Phase 2 was calculated from this individual pig weight data. These average pig weights for the pigs of Trial A and for the pigs of Trial B are provided in Table 3 below.

Additionally, the average daily weight gain for each young pig of Trial A was individually calculated and recorded for the Day 8 through Day 15 period of this example. The mean of the se average daily weight gains for the young pigs of Trial A during the Day 8 through Day 15 period was determined and is presented in Table 3 below. Likewise, the average daily weight gain for each young pig of Trial B was individually calculated and recorded for the Day 8 through Day 15 period of this example. The mean of these average daily weight gains for the young pigs of Trial B during the Day 8 through Day 15 period was determined and is also presented in Table 3 below.

Also, the average daily feed intake for each young pig of Trial A was individually calculated and recorded for the Day 8 through Day 15 period of this example. The mean of these average daily feed intakes for the young pigs of Trial A during the Day 8 through Day 15 period was determined and is presented in Table 3 below. Likewise, the average daily feed intake for each young pig of Trial B was individually calculated and recorded for the Day 8 through Day 15 period of this example. The mean of these average daily feed intakes for the young pigs of Trial B during the Day 8 through Day 15 period was determined and is also presented in Table 3 below. In Table 3, the values provided for the means of the ADFI for both Trials A and B are based upon the overall amount of feed (both the control feed with the liquid digest and the control feed that excluded the liquid digest) intake.

Finally, the feed to weight gain ratio for each young pig of Trial A was individually calculated and recorded for the Day 8 through Day 15 period of this example. The mean of these feed to weight gain ratios for the young pigs of Trial A during the Day 8 through Day 15 period was determined and is presented in Table 3 below. Likewise, the feed to weight gain ratio for each young pig of Trial B was individually calculated and recorded for the Day 8 through Day 15 period of this example. The mean of these feed to weight gain ratios for the young pigs of Trial B during the Day 8 through Day 15 period was determined and is also presented in Table 3 below. In Table 3, the values provided for the means of the feed to weight gain ratios for both Trials A and B are based upon the overall amount of feed (both the control feed with the liquid digest and the control feed that excluded the liquid digest) consumed.

TABLE 3

| VARIABLE | WHEN DETERMINED | TRIAL A | TRIAL B |
| --- | --- | --- | --- |
| Average Weight (pounds) | Day 0 | 14.42 | 15.60 |
| Average Weight (pounds) | Day 7 | 18.97 | 19.94 |
| Average Weight (pounds) | Day 15 | 24.88 | 26.62 |
| ADG (pounds) | Days 8–15 | 0.739 | 0.835 |
| ADFI (pounds) | Days 8–15 | 0.925 | 0.962 |
| Ave. feed:gain (weight basis) | Days 8–15 | 1.258 | 1.15 |

The average daily feed intake during the Day 8 through Day 15 period of this example, separately broken out for (1) the control feed that excluded the liquid digest and for (2) the control feed with the liquid digest, were individually calculated for each young pig of Trial A and also for each young pig of Trial B. The means of these average daily feed intakes for the young pigs of Trial A and for the young pigs of Trial B during the Day 8 through Day 15 period were determined for (1) the control feed that excluded the liquid digest and for (2) the control feed with the liquid digest and are presented in Table 4 below.

TABLE 4

| VARIABLE | TRIAL A | TRIAL B |
| --- | --- | --- |
| ADFI - Control w/o Digest | 0.312 | 0.128 |
| ADFI - Control w/Digest | 0.612* | 0.833** |
| P | <0.05 | <0.01 |

*feed coated with natural chicken liquid digest with crab flavor
**feed coated with liquid digest for dogs The data in Table 4 demonstrates that the young pigs in Trial A of Phase 2 preferred the control feed coated with the liquid digest to the control feed alone. Specifically, in Trial A, the young pigs preferred the control feed coated with the natural chicken liquid digest with crab flavor over the control feed alone by a factor of nearly 2:1. Significantly, less than 5% of the increase in daily intake of the feed coated with the natural chicken liquid digest with crab flavor is attributable to factors other than the liquid digest coating on the control feed.

The data in Table 4 also demonstrates that the young pigs in Trial B of Phase 2 preferred the control feed coated with the digest to the control feed alone. Specifically, in Trial B, the young pigs preferred the control feed coated with the liquid digest for dogs over the control feed alone by a factor of more than 6.5:1. Significantly, less than 1% of the increase in daily intake of the feed coated with the liquid digest for dogs is attributable to factors other than the liquid digest coating on the control feed. Ultimately, the data presented in Table 4 demonstrates with statistical certainty that the young pigs prefer feed coated with liquid digest, in accordance with the present invention, over feed that does not include any liquid digest.

Example 2

Example 2 demonstrates that post-weaned pigs prefer the control feed that includes a coating of the liquid digest over the control feed that does not include a coating of the liquid digest. In Phase 1 of this example, sixteen (16) newly-weaned pig (i.e., weanling) that were 21 days old, on average, were randomly assigned to individual pens in a conventional heated nursery. In the nursery, each pig was housed in the individual pens, separately from any other pig. The nursery was maintained at 85° F. during the first week (days 0–7) of this example, and was decreased by 3° F. each week thereafter, starting with day 8 of this example.

During Phase 1 of this example, which lasted for eight days, the sixteen pigs were fed a common commercially available piglet nursery diet. At the end of Phase 1, and the start of Phase 2, the sixteen pigs were randomly assigned to either Trial A or Trial B of Phase 2. Eight of the sixteen pigs were assigned to Trial A, and the other eight of the sixteen pigs were assigned to Trial B. Phase 2 lasted for eight days. Thus, Phase 1 ran from day 0 to day 8, and Phase 2 ran from day 9 to day 16 of this example, where day 0 was the day the sixteen piglets were weaned from their sows.

One purpose of splitting the sixteen different pigs between Trial A and Trial B was to evaluate the preference of the pigs for the control feed that was free of liquid digest versus the combination of the control feed and the liquid digest, where different liquid digests were used in Trial A and in Trial B. In Trial A, the liquid digest was liquid digest for dogs (product code no. 040120) that was obtained from American Dehydrated Foods, Inc. of Springfield, Mo. In Trial B, the liquid digest was liquid ocean fish digest (product code no. 050420) that was also obtained from American Dehydrated Foods, Inc. The same control feed was used in both Trial A and Trial B.

In Trial A, from day 9 through day 16, each of the pigs in the eight individual pens of Trial A had equal ad libitum access to water and to both the control feed and to the control feed coated with the liquid digest used in Trial A. In Trial A, the liquid digest, when used, was sprayed onto the control feed at the rate of about 2 pounds of the liquid digest per one hundred (100) pounds of the control feed using a conventional hand operated sprayer. The control feed in Trial A was in pellet form. Prior to applying the liquid digest to the control feed, the liquid digest was heated to a temperature ranging from about 100° F. to about 120° F.

In Trial B, from day 9 through day 16, each of the pigs in the eight individual pens of Trial B had equal ad libitum access to water and to both the control feed and to the control feed coated with the liquid digest used in Trial B. In Trial B, the liquid digest, when used, was sprayed onto the control feed at the rate of about 2 pounds of the liquid digest per one hundred (100) pounds of the control feed using a conventional hand operated sprayer. The control feed in Trial B was in pellet form. Prior to applying the liquid digest to the control feed, the liquid digest was heated to a temperature ranging from about 100° F. to about 120° F.

In both Trial A and Trial B, each individual pen contained a nipple water drinker and a two-hole feeder for the two different test feeds. The two feeders were each labeled for the respective diet that each one contained, and the location of each feeder was shifted daily to eliminate any bias as to the location of the feeder. Feed consumption for each different feed for each of the different pigs was recorded daily during Phase 2 in both Trial A and Trial B.

In Trial A and Trial B, the weight of each young pig was measured and individually recorded daily. The average weight of the eight pigs of Trial A on Day 0 and on Day 8 of Phase 1 and on Day 16 of Phase 2 was calculated from this individual pig weight data. Likewise, the average weight of the eight pigs of Trial B on Day 0 and on Day 8 of Phase 1 and on Day 16 of Phase 2 was calculated from this individual pig weight data. These average pig weights for the pigs of Trial A and for the pigs of Trial B are provided in Table 5 below.

TABLE 5

| VARIABLE | WHEN DETERMINED | TRIAL A | TRIAL B |
| --- | --- | --- | --- |
| Average Weight (pounds) | Day 0 | 16.43 | 16.39 |
| Average Weight (pounds) | Day 8 | 20.26 | 21.78 |
| Average Weight (pounds) | Day 16 | 27.66 | 29.84 |

The average daily feed intake during the Day 9 through Day 16 period of this example, separately broken out for (1) the control feed that excluded the liquid digest and for (2) the control feed with the liquid digest, were individually calculated for each young pig of Trial A and also for each young pig of Trial B. The means of these average daily feed intakes for the young pigs of Trial A and for the young pigs of Trial B during the Day 9 through Day 16 period were determined for (1) the control feed that excluded the liquid digest and for (2) the control feed with the liquid digest and are presented in Table 6 below.

TABLE 6

| VARIABLE | TRIAL A | TRIAL B |
| --- | --- | --- |
| ADFI - Control w/o Digest | 0.227 | 0.675 |
| ADFI - Control w/Digest | 0.898* | 0.604** |
| P | <0.01 | N/A |

*feed coated with liquid digest for dogs
**feed coated with liquid ocean fish digest The data in Table 6 demonstrates that the young pigs in Trial A of Phase 2 preferred the control feed coated with the digest to the control feed alone. Specifically, in Trial A, the young pigs preferred the control feed coated with the liquid digest for dogs over the control feed alone by a factor of nearly 4:1. Significantly, less than 1% of the increase in daily intake of the feed coated with the liquid ocean fish digest is attributable to factors other than the liquid digest coating on the control feed. This data is consistent with the results from Trial B of Example 1 that also employed the liquid digest for dogs.

The data in Table 6 surprisingly demonstrates that the young pigs in Trial B of Phase 2 had no real preference for the control feed coated with the digest versus the control feed alone. The data presented in Table 6 demonstrates with statistical certainty that the young pigs prefer feeds coated with liquid digest, in accordance with the present invention, over feed that does not include any liquid digest.

Discussion of Results Obtained in Examples 1 and 2

In the preference trials of Examples 1 and 2, three different liquid digests were evaluated: liquid digest for dogs, natural chicken liquid digest with crab flavor, and liquid ocean fish digest. The liquid digest for dogs is primarily derived from chicken, the natural chicken liquid digest with crab flavor is derived from chicken, but also includes crab paste (a seafood), while the liquid ocean fish digest is primarily derived from ocean fish (a seafood). The preference trial data of Examples 1 and 2 suggests that young post-weaned pigs, especially during about the first week of a Phase 2 feeding period, prefer both the control feed with liquid digest for dogs and the control feed with natural chicken liquid digest with crab flavor over the control feed that is free of added digest. Furthermore, the preference trial data of Examples 1 and 2 suggests that young post-weaned pigs do not consider liquid ocean fish digest to be a palatability enhancer, at least during about the first week of a Phase 2 feeding period.

Example 3

This example further demonstrates that post-weaned pigs prefer the control feed that includes a coating of the liquid digest over the control feed that does not include a coating of the liquid digest. This example additionally demonstrates that a spray-dried form of liquid digest that is incorporated in the control feed does not enhance the appetite of the young pigs for the control feed.

In this example, one hundred twenty (120) newly-weaned pigs (i.e., weanling) that were 21 days old, on average, and had an average body weight of 13.8 pounds at weaning were subjected to a thirty-three (33) day feeding experiment. One purpose of this example was to evaluate the effectiveness of three different forms of digest for improving the performance of young pigs.

Two different application rates of the liquid digest for dogs were employed in this example, and the third digest form was a spray dried poultry digest that was substituted in the control feed in place of an equal weight of a processed soy protein component of the control feed. As in Examples 1 and 2, the liquid digest for dogs (product code no. 040120) was obtained from American Dehydrated Foods, Inc. of Springfield, Mo. The spray dried poultry digest was prepared by first forming natural chicken flavor liquid digest that was enzymatically derived from poultry liver, chicken by-products, and brewer's yeast and also contained phosphoric acid, calcium propionate, and natural antioxidants. The natural chicken flavor liquid digest was then spray dried to form the spray dried poultry digest.

All one hundred twenty pigs in this example were initially fed a commercial Phase 1 diet for the first 7 days following weaning (day 0 through day 7). Then during Phase 2 of this example, the digest feeding trials were conducted. Phase 2 of this example extended from day 8 (8 days after weaning) to day 21 (21 days after weaning). In Trial A of Phase 2, thirty of the one hundred twenty test pigs were fed the control feed. In Trial B of Phase 2, another thirty of the one hundred test pigs were fed the control feed that had been coated with the liquid digest for dogs, where the liquid digest for dogs was applied to the control feed at the rate of about 1 pound of the liquid digest per one hundred (100) pounds of the control feed.

In Trial C of Phase 2, another thirty of the test pigs were fed the control feed that had been coated with the liquid digest for dogs, where the liquid digest for dogs was applied to the control feed at the rate of about 2 pounds of the liquid digest per one hundred (100) pounds of the control feed. Finally, in Trial D of Phase 2, the final thirty of the test pigs were fed the control feed, where the spray dried poultry digest was substituted in the control feed in place of an equal weight of a processed soy protein component of the control feed. In Trial D of Phase 2, the spray dried poultry digest was present in the control feed at a concentration of about 0.7 weight percent, based on the total weight of the combination of the control feed and the spray-dried poultry digest that was incorporated in the control feed. At the end of Phase 2, all one hundred twenty pigs received a commercial Phase 3 diet for the final 12 days (day 22 through day 33) of this example. The same control feed was used in Trial A, Trial B, Trial C, and Trial D.

Twenty-four pens that could house five pigs each were included in a conventional heated pig nursery. The nursery was maintained at 85° F. during the first week (days 0–7) of this example, and was decreased by 3° F. each week thereafter, starting with day 8 of this example. Each of the twenty-four pens had wire flooring, a nipple water drinker, and a three-hole feeder. The pigs in each pen had ad libitum access to feed and water. The three hole feeders were included in each pen to insure that each of the pigs in each pen had ready access to the particular feed included in the different pens during Phase 1, Phase 2, and Phase 3 of this example.

Six of the twenty-four pens were assigned to participate in Trial A of Phase 2, another six of the twenty-four pens were assigned to participate in Trial B of Phase 2, another six of the twenty-four pens were assigned to participate in Trial C of Phase 2, and the last six of the twenty-four pens were assigned to participate in Trial D of Phase 2. Five pigs were assigned to each of the twenty-four different pens via a randomized complete block design. The pigs were blocked based upon their weight at weaning. After being blocked by weaning weight, the one hundred twenty pigs were randomly allotted to either the six pens of Trial A, the six pens of Trial B, the six pens of Trial C, or the six pens of Trial D.

In Trial A of Phase 2, from day 8 through day 21 of this example, each of the five pigs in each of the six different pens of Trial A had equal access to the control feed, where the control feed did not include any of the liquid digest or any of the spray-dried digest. The control feed in Trial A was in pellet form.

In Trial B of Phase 2, from day 8 through day 21 of this example, each of the five pigs in each of the six different pens of Trial B had equal access to the control feed coated with the liquid digest for dogs. In Trial B, the liquid digest was sprayed onto the control feed at the rate of about one pound of the liquid digest per one hundred (100) pounds of the control feed using a conventional hand operated sprayer. The control feed in Trial B was in pellet form. Prior to applying the liquid digest to the control feed, the liquid digest was heated to a temperature ranging from about 100° F. to about 120° F.

In Trial C of Phase 2, from day 8 through day 21 of this example, each of the five pigs in each of the six different pens of Trial C had equal access to the control feed coated with the liquid digest for dogs. In Trial C, the liquid digest was sprayed onto the control feed at the rate of about two pounds of the liquid digest per one hundred (100) pounds of the control feed using a conventional hand operated sprayer. The control feed in Trial C was in pellet form. Prior to applying the liquid digest to the control feed, the liquid digest was heated to a temperature ranging from about 100° F. to about 120° F.

In Trial D of Phase 2, from day 8 through day 21 of this example, each of the five pigs in each of the six different pens of Trial D had equal access to the control feed that incorporated the spray dried poultry digest in place of an equal weight of the processed soy protein component of the control feed. The spray dried poultry digest was present in the control feed at a concentration of about 0.7 weight percent, based on the total weight of the combination of the control feed and the spray-dried poultry digest that was incorporated in the control feed. The control feed in Trial D was in pellet form.

In Trial A, Trial B, Trial C, and Trial D, the collective weight of the young pigs in each pen (5 pigs per pen) was periodically measured and recorded, by pen. The average weight of the thirty pigs of Trial A, the thirty pigs of Trial B, the thirty pigs of Trial C, and the thirty pigs of Trial D, on Day 0 and on Day 7 of Phase 1, on Day 14 and on Day 21 of Phase 2, and on Day 33 of Phase 3, was calculated from this pen-based average pig weight data. These pen-based average pig weights for the pigs of Trial A, Trial B, Trial C, and Trial D are provided in Table 7 below.

In Trial A, Trial B, Trial C, and Trial D, the collective feed consumption of the young pigs in each pen (5 pigs per pen) was periodically measured and recorded, by pen. Also, the average daily feed intake of the young pigs in each pen (5 pigs per pen) was determined and recorded, by pen, for the following different periods of this example: Day 0 through Day 7; Day 8 through Day 14; Day 15 through Day 21, Day 21 through Day 33; Day 8 through Day 21; and Day 1 through Day 33. Next, the average daily weight gain of the young pigs in each pen (5 pigs per pen) was determined and recorded, by pen, for the following different periods of this example: Day 0 through Day 7; Day 8 through Day 14; Day 15 through Day 21, Day 21 through Day 33; Day 8 through Day 21; and Day 1 through Day 33. Additionally, the average feed consumption to weight gain ratio for the young pigs in each pen (5 pigs per pen) was calculated and recorded, by pen, for the following different periods of this example: Day 0 through Day 7; Day 8 through Day 14; Day 15 through Day 21, Day 21 through Day 33; Day 8 through Day 21; and Day 1 through Day 33.

The mean daily feed intake for the young pigs of Trial A, Trial B, Trial C, and Trial D was determined for the following different periods of this example: Day 0 through Day 7; Day 8 through Day 14; Day 15 through Day 21, Day 21 through Day 33; Day 8 through Day 21; and Day 1 through Day 33. These mean daily feed intake values were derived from the average daily feed consumption intake data recorded, by pen, for the young pigs of Trial A, Trial B, Trial C, and Trial D. The mean daily weight gain for the young pigs of Trial A, Trial B, Trial C, and Trial D was determined for the following different periods of this example: Day 0 through Day 7; Day8 through Day 14; Day 15 through Day21, Day 21 through Day 33; Day 8 through Day 21; and Day 1 through Day 33. These mean daily weight gain values were derived from the average daily weight gain data recorded, by pen, for the young pigs of Trial A, Trial B, Trial C, and Trial D.

Finally, the mean feed consumption to weight gain ratio for the young pigs of Trial A, Trial B, Trial C, and Trial D was determined for the following different periods of this example: Day 0 through Day 7; Day 8 through Day 14; Day 15 through Day 21, Day 21 through Day 33; Day 8 through Day 21; and Day 1 through Day 33. These mean feed consumption to weight gain ratios were derived from the average mean feed consumption to weight gain ratio data recorded, by pen, for the young pigs of Trial A, Trial B, Trial C, and Trial D. This mean daily feed intake data, mean daily weight gain data, and mean feed consumption to weight gain ratio data for the young pigs of Trial A, Trial B, Trial C, and Trial D is tabulated in Table 7:

TABLE 7

Effect of Liquid and Dried Digests on Performance of Young Pigs

| VARIABLE | LIQUID DIGEST FOR DOGS, % | | | SPRAY DRIED POULTRY DIGEST | C.V. |
|---|---|---|---|---|---|
| | 0 TRIAL A | 1 TRIAL B | 2 TRIAL C | TRIAL D | |
| Phase 1 (Days 0 to 7) | | | | | |
| ADG (lbs) | 433 | .458 | .446 | .420 | 18.9 |
| ADFI (lbs) | 475 | .522 | .492 | .497 | 13.8 |
| Feed:gain (weight basis) | 1.101 | 1.146 | 1.121 | 1.198 | 7.2 |
| Phase 2; Week 1 (Days 8–14) | | | | | |
| ADG (lbs)[a] | 630 | .671 | .718 | .632 | 13.9 |
| ADFI (lbs) | 784 | .844 | .832 | .782 | 8.5 |
| Feed:gain (weight basis) | 1.256 | 1.291 | 1.158 | 1.249 | 11.6 |
| Phase 2; Week 2 (Days 15–21) | | | | | |
| ADG (lbs) | 839 | 827 | .851 | .771 | 12.7 |
| ADFI (lbs) | 1.142 | 1.171 | 1.160 | 1.086 | 10.1 |
| Feed:gain (weight basis) | 1.391 | 1.444 | 1.374 | 1.427 | 6.8 |
| Phase 2 Overall (Days 8 to 21) | | | | | |
| ADG (lbs) | 736 | .749 | .784 | .701 | 10.8 |
| ADFI (lbs) | .961 | 1.01 | .996 | .933 | 8.9 |
| Feed:gain (weight basis) | 1.307 | 1.355 | 1.271 | 1.338 | 5.3 |
| Phase 3 (Days 22 to 33) | | | | | |
| ADG (lbs) | 1.333 | 1.376 | 1.351 | 1.328 | 5.28 |
| ADFI (lbs) | 2.088 | 2.151 | 2.156 | 2.066 | 4.96 |
| Feed:gain (weight basis) | 1.567 | 1.571 | 1.595 | 1.559 | 4.24 |

TABLE 7-continued

Effect of Liquid and Dried Digests on Performance of Young Pigs

| VARIABLE | LIQUID DIGEST FOR DOGS, % | | | SPRAY DRIED POULTRY DIGEST | C.V. |
|---|---|---|---|---|---|
| | 0 TRIAL A | 1 TRIAL B | 2 TRIAL C | TRIAL D | |
| Phases 1–3 Overall (Days 0 to 33) | | | | | |
| ADG (lbs) | .89 | .915 | .918 | .869 | 6.4 |
| ADFI (lbs) | 1.250 | 1.320 | 1.311 | 1.246 | 6.6 |
| Feed:gain (weight basis) | 1.399 | 1.446 | 1.426 | 1.432 | 4.4 |
| Initial Pig Age (days) on Day 0 | 21 | 21.1 | 20.93 | 20.78 | 1.8 |
| Initial Pig Weight on Day 0 (lbs) | 13.83 | 13.84 | 13.84 | 13.84 | .12 |
| Pig Weight on Day 7 (lbs) | 16.87 | 17.05 | 16.96 | 16.79 | 3.4 |
| Pig Weight on Day 14 (lbs) | 21.28 | 21.74 | 21.98 | 21.15 | 4.9 |
| Pig Weight on Day 21 (lbs) | 27.27 | 27.53 | 27.94 | 26.55 | 5.6 |
| Pig Weight on Day 33 (lbs) | 43.27 | 44.05 | 44.16 | 42.87 | 4.3 |

[a]Linear effect observed w/increased concentration of spray-applied poultry liquid digest (P = .11).

The data of this example demonstrates that feeding the pigs the control feed coated with the liquid digest for dogs in Trials B and C yielded a linear relationship (P=0.11) between the average daily gain relative to increases in the weight percent of liquid digest for dogs added to the control feed during the first week of Phase 2. Indeed, during the first week of Phase 2, the pigs of Trial C (control feed coated with about 2 weight percent of the liquid digest for dogs) gained weight more than 14 percent faster than the pigs of Trial A that were fed only the control feed that was free of digest. Also, during the first week of Phase 2, the pigs of Trial C (control feed coated with about 2 weight percent of the liquid digest for dogs) consumed more than 6% more feed and were nearly 8% more efficient at converting consumed feed to weight gain, as compared to the pigs of Trial A that were fed only the control feed that was free of digest.

On the other hand, there were no significant differences (P<0.20) observed for either the average daily gain, the average daily feed intake, or the feed:gain ratio for the pigs of Trial D (spray dried poultry digest incorporated in control feed) versus the pigs of Trial A that were fed only the control feed that was free of digest. This observation supports the conclusion that pigs prefer feed that is coated with liquid digest over feed that includes dry digest as a blended component.

Statistical irregularities (P<0.15) make it difficult to draw any clear conclusions about the effect of the added liquid digest in Trials B and C during week 2 of Phase 2 and during the combination of weeks 1 and 2 of Phase 2 on the average daily gain, the average daily feed intake, and the feed:gain ratio. It is noteworthy, however, that the average daily gain during the first week of Phase 2 by the pigs of Trial C (control feed coated with about 2 weight percent of the liquid digest for dogs) contributed to an overall numerical increase in the average daily gain during the combination of weeks 1 and 2 of Phase 2 of more than 6 weight percent by the pigs of Trial C versus the pigs of Trial A that were fed only the control feed that was free of digest.

In general, the data of this example is consistent with the conclusion from Examples 1 and 2 that liquid digest for dogs, when sprayed over the control feed, as in Trials B and C of Phase 2, functions as an appetite enhancer that increases feed consumption by the young pigs. On the other hand, however, mixing spray-dried digest as part of the control feed when manufacturing the control feed does not cause any statistically significant increase in feed consumption by the young pigs, as compared to feeding the control feed that is free of digest to the pigs. Indeed, average daily feed intake data for the combination of weeks 1 and 2 during phase 2 surprisingly shows the pigs actually consumed less feed when the control feed contained the spray dried poultry digest (Trial D) as compared to the control feed that was free of digest, as in Trial A. Thus, the data suggests that young pigs prefer feeds sprayed with liquid digest over feeds that incorporate a dry digest that is blended as a component of the feed.

Example 4

This example further demonstrates that post-weaned pigs prefer the control feed that includes a coating of the liquid digest over the control feed that does not include a coating of the liquid digest. In this example, sixty (60) newly-weaned pigs (i.e., weanlings) that were 19 days old, on average, and had an average body weight of about 11 pounds at weaning were subjected to a twenty-one (21) day feeding experiment. One purpose of this example was to further evaluate the effectiveness of the liquid digest for dogs that was used in Examples 1–3 for improving the performance of young pigs.

All sixty pigs in this example were initially fed a commercial Phase 1 diet for the first eight days following weaning (day 0 through day 8). Then during Phase 2 of this example, the digest feeding trial was conducted. Phase 2 of this example extended from day 9 (9 days after weaning) to day 21 (21 days after weaning). In Trial A of Phase 2, thirty of the sixty test pigs were fed the control feed. In Trial B of Phase 2, the other thirty test pigs were fed the control feed that had been coated with the liquid digest for dogs, where the liquid digest for dogs was applied to the control feed at the rate of about 2 pounds of the liquid digest per one hundred (100) pounds of the control feed.

Twenty pens were included in a conventional heated pig nursery. The nursery was maintained at 85° F. during the first week (days 0–7) of this example, and was decreased by 3° F. each week thereafter, starting with day 9 of this example. Each of the twenty pens had wire flooring, a pair of nipple water drinkers, and a 2-hole feeder. The pigs in each pen had ad libitum access to feed and water. The two-hole feeders were included in each pen to insure that each of the pigs in each pen had ready access to the particular feed included in the different pens during Phase 1 and Phase 2 of this example.

Ten of the twenty pens were assigned to participate in Trial A of Phase 2, and the other ten pens were assigned to participate in Trial B of Phase 2. Three pigs were assigned to each of the twenty different pens via a randomized complete block design. The pigs were blocked based upon their weight at weaning. After being blocked by weaning weight, the sixty pigs were randomly allotted to either the ten pens of Trial A or the ten pens of Trial B.

In Trial A of Phase 2, from day 9 through day 21 of this example, each of the three pigs in each of the ten different pens of Trial A had equal access to the control feed, where the control feed did not include any digest. The control feed in Trial A was in pellet form. In Trial B of Phase 2, from day 9 through day 21 of this example, each of the three pigs in each of the ten different pens of Trial B had equal access to the control feed coated with the liquid digest for dogs. In Trial B, the liquid digest for dogs was sprayed onto the control feed at the rate of about two pounds of the liquid digest for dogs per one hundred (100) pounds of the control feed using a conventional hand operated sprayer. The control feed in Trial B was in pellet form. The liquid digest for dogs (product code no. 040120) was obtained from American Dehydrated Foods, Inc. of Springfield, Mo. Prior to applying the liquid digest to the control feed, the liquid digest was heated to a temperature ranging from about 100° F. to about 120° F. The same control feed was used in both Trial A and Trial B.

In Trial A and Trial B, the collective weight of the young pigs in each pen (3 pigs per pen) was periodically measured and recorded, by pen. The average weight of the thirty pigs of Trial A and the thirty pigs of Trial B, on Day 0 and on Day 8 of Phase 1 and on Day 15 and on Day 21 of Phase 2, was calculated from this pen-based average pig weight data. These pen-based average pig weights for the pigs of Trial A and Trial B are provided in Table 8 below.

In Trial A and Trial B, the collective feed consumption of the young pigs in each pen (3 pigs per pen) was periodically measured and recorded, by pen. Also, the average daily feed intake of the young pigs in each pen (3 pigs per pen) was determined and recorded, by pen, for the following different periods of this example: Day 9 through Day 15; Day 16 through Day 21, Day 9 through Day 21; and Day 1 through Day 21. Next, the average daily weight gain of the young pigs in each pen (3 pigs per pen) was determined and recorded, by pen, for the following different periods of this example: Day 9 through Day 15; Day 16 through Day 21, Day 9 through Day 21; and Day 1 through Day 21. Additionally, the average feed consumption to weight gain ratio for the young pigs in each pen (3 pigs per pen) was calculated and recorded, by pen, for the following different periods of this example: Day 9 through Day 15; Day 16 through Day 21, Day 9 through Day 21; and Day 1 through Day 21.

The mean daily feed intake for the young pigs of Trial A and Trial B was determined for the following different periods of this example: Day 9 through Day 15; Day 16 through Day 21, Day 9 through Day 21; and Day 1 through Day 21. These mean daily feed intake values were derived from the average daily feed consumption intake data recorded, by pen, for the young pigs of Trial A and Trial B. The mean daily weight gain for the young pigs of Trial A and Trial B was determined for the following different periods of this example: Day 9 through Day 15; Day 16 through Day 21, Day 9 through Day 21; and Day 1 through Day 21. These mean daily weight gain values were derived from the average daily weight gain data recorded, by pen, for the young pigs of Trial A and Trial B.

Finally, the mean feed consumption to weight gain ratio for the young pigs of Trial A and Trial B was determined for the following different periods of this example: Day 9 through Day 15; Day 16 through Day 21, Day 9 through Day 21; and Day 1 through Day 21. These mean feed consumption to weight gain ratios were derived from the average mean feed consumption to weight gain ratio data recorded, by pen, for the young pigs of Trial A and Trial B. This mean daily feed intake data, mean daily weight gain data, and mean feed consumption to weight gain ratio data for the young pigs of Trial A and Trial B is tabulated in Table 8:

TABLE 8

Effect of Liquid Digest for Dogs on Performance of Phase 2 Nursery Pigs[a]

| | TREATMENT | | |
|---|---|---|---|
| VARIABLE | CONTROL TRIAL A | 2% LIQUID DIGEST FOR DOGS TRIAL B | CV |
| Phase 2; Week 1 (Days 9–15) | | | |
| ADG (lbs) | .539[c] | .632[d] | 12.64 |
| ADFI (lbs) | .703[c] | .782[d] | 9.13 |
| Feed:gain (weight basis) | 1.316[e] | 1.244[f] | 6.41 |
| Phase 2; Week 2 (Days 16–21) | | | |
| ADG (lbs) | .698[g] | .956[h] | 17.54 |
| ADFI (lbs) | .903[g] | 1.127[h] | 13.18 |
| Feed:gain (weight basis) | 1.317[c] | 1.185[d] | 8.19 |
| Phase 2 Overall (Days 9–21) | | | |
| ADG (lbs) | .612[g] | .782[h] | 12.06 |
| ADFI (lbs) | .795[g] | .941[h] | 9.41 |
| Feed:gain (weight basis) | 1.311[g] | 1.203[h] | 4.90 |
| Overall (d 0 to 21) | | | |
| ADG (lbs) | .499[g] | .603[h] | 9.44 |
| ADFI (lbs) | .636[g] | .736[h] | 7.37 |
| Feed:gain (weight basis) | 1.283[g] | 1.221[h] | 3.18 |
| Initial Pig Age (days) on Day 0 | 19.28 | 19.53 | 3.50 |
| Initial Pig Weight on Day 0 (lbs) | 11.03 | 11.04 | .272 |
| Pig Weight on Day 8[b] (lbs) | 13.35 | 13.73 | 5.93 |
| Pig Weight on Day 15 (lbs) | 17.31[c] | 17.97[d] | 2.93 |
| Pig Weight on Day 21 (lbs) | 21.50[g] | 23.71[h] | 4.83 |

[a]Data are means of ten pens of three pigs each, for Trials A and B, respectively.
[b]Pig weight on day 8 (end of Phase 1) was used as a covariance to analyze Phase 2 data and overall Phase 1–2 performance data.
[cd]Means in the same row with different superscript letter differ by $P < .05$.
[ef]Means in the same row with different superscript letter differ by $P < .09$.
[gh]Means in the same row with different superscript letter differ by $P < .01$.

The data of this Example demonstrates ($P<0.05$) that feeding the pigs the control feed coated with the liquid digest for dogs during the first week of Phase 2 caused the pigs of Trial B to gain weight more than 17 percent faster than the pigs of Trial A that were fed only the control feed that was free of digest. Also, during the first week of Phase 2, the pigs of Trial B (control feed coated with liquid digest for dogs) consumed more than 11% more feed ($P<0.05$) and were more than 5% more efficient at converting consumed feed to weight gain ($P<0.09$), as compared to the pigs of Trial A that were fed only the control feed that was free of digest.

The data of this Example also demonstrates ($P<0.01$) that feeding the pigs the control feed coated with the liquid digest for dogs during the second week of Phase 2 caused the pigs of Trial B to gain weight nearly 17 percent faster than the pigs of Trial A that were fed only the control feed that was free of digest. Also, during the second week of Phase 2, the pigs of Trial B (control feed coated with liquid digest for dogs) consumed nearly 25% more feed ($P<0.01$) and were at least about 10% more efficient at converting consumed feed to weight gain ($P<0.05$), as compared to the pigs of Trial A that were fed only the control feed that was free of digest.

Over the entire two week period of Phase 2, the data of this Example demonstrates ($P<0.01$) that feeding the pigs the control feed coated with the liquid digest for dogs caused the pigs of Trial B to gain weight nearly 28 percent faster than the pigs of Trial A that were fed only the control feed that was free of digest. Also, over the entire two week period of Phase 2, the pigs of Trial B (control feed coated with liquid digest for dogs) consumed more than 18% more feed ($P<0.01$) and were more than 8% more efficient at converting consumed feed to weight gain ($P<0.01$), as compared to the pigs of Trial A that were fed only the control feed that was free of digest.

Furthermore, over the entire 21 days of Phase 1 and Phase 2, the data of this Example demonstrates ($P<0.01$) that feeding the pigs the control feed coated with the liquid digest for dogs caused the pigs of Trial B to gain weight more than 20 percent faster than the pigs of Trial A that were fed only the control feed that was free of digest. Also, over the entire 21 days of Phase 1 and Phase 2, the pigs of Trial B (control feed coated with liquid digest for dogs) consumed nearly 16% more feed ($P<0.01$) and were nearly 5% more efficient at converting consumed feed to weight gain ($P<0.01$), as compared to the pigs of Trial A that were fed only the control feed that was free of digest.

Thus, over the entire 21 day experimental period of Phase 1 and Phase 2, the pigs fed the Trial B diet with the liquid digest exhibited significantly greater weight gain and significantly greater feed intake and were significantly more efficient at converting feed to weight gain than pigs fed the diet of Trial A that excluded the digest. Ultimately, at the end of the 21 day experimental period, the pigs of Trial B that were fed the control feed with liquid digest for dogs were more than 2.2 pounds heavier ($P<0.01$) than the pigs of Trial A that were fed the control feed that did not include any digest. Clearly, coating the control feed with the liquid digest for dogs during Phase 2 of this example improved the performance of the nursery pigs of Trial B versus the pigs fed the diet of Trial A that excluded the digest.

Example 5

This example further demonstrates that post-weaned pigs prefer the control feed that includes a coating of the liquid digest over the control feed that does not include a coating of the liquid digest. In this example, forty-eight (48) newly-weaned pigs (i.e., weanlings) that were 19 days old, on average, and had an average body weight of about 15.9 pounds at weaning were subjected to a twenty-two (22) day feeding experiment. One purpose of this example was to further evaluate the effectiveness of the liquid digest for dogs that was used in Examples 1–4 for improving the performance of young pigs.

All forty-eight pigs in this example were initially fed a commercial Phase 1 diet for the first eight days following weaning (day 0 through day 8). Then during Phase 2 of this example, the digest feeding trial was conducted. Phase 2 of this example extended from day 9 (9 days after weaning) to day 22 (22 days after weaning). In Trial A of Phase 2, twenty-four of the forty-eight test pigs were fed the control feed. In Trial B of Phase 2, the other twenty-four test pigs were fed the control feed that had been coated with the liquid digest for dogs, where the liquid digest for dogs was applied to the control feed at the rate of about 2 pounds of the liquid digest per one hundred (100) pounds of the control feed. The same control feed was used in both Trial A and Trial B.

Twelve pens were included in a conventional heated pig nursery. The nursery was maintained at 85° F. during the first week (days 0–7) of this example, and was decreased by 3° F. each week thereafter, starting with day 8 of this example. Each of the twelve pens had wire flooring, a pair of nipple water drinkers, and a 2-hole feeder. The pigs in each pen had ad libitum access to feed and water. The two-hole feeders were included in each pen to insure that each of the pigs in each pen had ready access to the particular feed included in the different pens during Phase 1 and Phase 2 of this example.

Six of the twelve pens were assigned to participate in Trial A of Phase 2, and the other six pens were assigned to participate in Trial B of Phase 2. Four pigs were assigned to each of the twelve different pens via a randomized complete block design. The pigs were blocked based upon their weight at weaning. After being blocked by weaning weight, the forty-eight pigs were randomly allotted to either the six pens of Trial A or the six pens of Trial B.

In Trial A of Phase 2, from day 9 through day 22 of this example, each of the four pigs in each of the six different pens of Trial A had equal access to the control feed, where the control feed did not include any digest. The control feed in Trial A was in pellet form. In Trial B of Phase 2, from day 9 through day 22 of this example, each of the four pigs in each of the six different pens of Trial B had equal access to the control feed coated with the liquid digest for dogs.

In Trial B, the liquid digest for dogs was sprayed onto the control feed at the rate of about two pounds of the liquid digest for dogs per one hundred (100) pounds of the control feed using a conventional hand operated sprayer. The control feed in Trial B was in pellet form. The liquid digest for dogs (product code no. 040120) was obtained from American Dehydrated Foods, Inc. of Springfield, Mo. Prior to applying the liquid digest to the control feed, the liquid digest was heated to a temperature ranging from about 100° F. to about 120° F.

In Trial A and Trial B, the collective weight of the young pigs in each pen (4 pigs per pen) was periodically measured and recorded, by pen. The average weight of the twenty-four pigs of Trial A and the twenty-four pigs of Trial B, on Day 0 and on Day 8 of Phase 1 and on Day 15 and on Day 22 of Phase 2, was calculated from this pen-based average pig weight data. These pen-based average pig weights for the pigs of Trial A and Trial B are provided in Table 9 below.

In Trial A and Trial B, the collective feed consumption of the young pigs in each pen (4 pigs per pen) was periodically measured and recorded, by pen. Also, the average daily feed intake of the young pigs in each pen (4 pigs per pen) was determined and recorded, by pen, for the following different periods of this example: Day 9 through Day 15 and Day 9 through Day 22. Next, the average daily weight gain of the young pigs in each pen (4 pigs per pen) was determined and recorded, by pen, for the following different periods of this example: Day 9 through Day 15 and Day 9 through Day 22. Additionally, the average feed consumption to weight gain ratio for the young pigs in each pen (4 pigs per pen) was calculated and recorded, by pen, for the following different periods of this example: Day 9 through Day 15 and Day 9 through Day 22.

The mean daily feed intake for the young pigs of Trial A and Trial B was determined for the following different periods of this example: Day 9 through Day 15 and Day 9 through Day 22. These mean daily feed intake values were derived from the average daily feed consumption intake data recorded, by pen, for the young pigs of Trial A and Trial B. The mean daily weight gain for the young pigs of Trial A and Trial B was determined for the following different periods of this example: Day 9 through Day 15 and Day 9 through Day 22. These mean daily weight gain values were calculated from the average daily weight gain data recorded, by pen, for the young pigs of Trial A and Trial B.

Finally, the mean feed consumption to weight gain ratio for the young pigs of Trial A and Trial B was determined for the following different periods of this example: Day 9 through Day 15 and Day 9 through Day 22. These mean feed consumption to weight gain ratios were derived from the average mean feed consumption to weight gain ratio data recorded, by pen, for the young pigs of Trial A and Trial B. This mean daily feed intake data, mean daily weight gain data, and mean feed consumption to weight gain ratio data for the young pigs of Trial A and Trial B is tabulated in Table 9:

TABLE 9

Effect of Liquid Digest for Dogs on Performance of Phase 2 Nursery Pigs[a]

| VARIABLE | TREATMENT | | CV |
|---|---|---|---|
| | CONTROL TRIAL A | 2% LIQUID DIGEST FOR DOGS TRIAL B | |
| Phase 2; Week 1 (Days 9–16) | | | |
| ADG (lbs) | .684[c] | .931[d] | 20.0 |
| ADFI (lbs) | .889[c] | 1.139[d] | 15.3 |
| Feed:gain (weight basis) | 1.409 | 1.176 | 17.9 |

TABLE 9-continued

Effect of Liquid Digest for Dogs on Performance of Phase 2 Nursery Pigs[a]

| | TREATMENT | | |
|---|---|---|---|
| VARIABLE | CONTROL TRIAL A | 2% LIQUID DIGEST FOR DOGS TRIAL B | CV |
| Phase 2 Overall (Days 9–22) | | | |
| ADG (lbs) | .861[e] | 1.044[f] | 13.2 |
| ADFI (lbs) | 1.082 | 1.341 | 16.8 |
| Feed:gain (weight basis) | 1.257 | 1.289 | 5.9 |
| Initial Pig Weight on Day 0 (lbs) | 15.90 | 15.90 | .14 |
| Pig Weight on Day 8[b] (lbs) | 19.17 | 18.61 | 2.6 |
| Pig Weight on Day 15 (lbs) | 23.67[c] | 25.40[d] | 4.6 |
| Pig Weight on Day 22 (lbs) | 30.94[e] | 33.50[f] | 5.4 |

[a]Data are means of six pens of four pigs each, for Trials A and B, respectively.
[b]Pig weight on day 8 (end of Phase 1) was used as a covariance to analyze Phase 2 data and overall Phase 1–2 performance data.
[c,d]Means in the same row with different superscript letter differ by P < .11.
[e,f]Means in the same row with different superscript letter differ by P < .12

The data of this Example demonstrates (P<0.11) that feeding the pigs the control feed coated with the liquid digest for dogs during the first week of Phase 2 caused the pigs of Trial B to gain weight more than 36 percent faster than the pigs of Trial A that were fed only the control feed that was free of digest. Also, during the first week of Phase 2, the pigs of Trial B (control feed coated with liquid digest for dogs) consumed more than 28% more feed (P<0.11), as compared to the pigs of Trial A that were fed only the control feed that was free of digest.

Over the entire two week period of Phase 2, the data of this Example demonstrates (P<0.12) that feeding the pigs the control feed coated with the liquid digest for dogs caused the pigs of Trial B to gain weight more than 21 percent faster than the pigs of Trial A that were fed only the control feed that was free of digest. Ultimately, at the end of the 22 day experimental period, the pigs of Trial B that were fed the control feed with liquid digest for dogs were more than 2.5 pounds heavier (P<0.12) than the pigs of Trial A that were fed the control feed that did not include any digest. Clearly, coating the control feed with the liquid digest for dogs during Phase 2 of this example improved the performance of the nursery pigs of Trial B versus the pigs fed the diet of Trial A that excluded the digest.

Example 6

This example further demonstrates that post-weaned pigs prefer the control feed that includes a coating of liquid digest for dogs over the control feed that does not include a coating of liquid digest. This example also shows that post-weaned pigs prefer the control feed that includes a coating of the liquid ocean fish digest over the control feed that does not include a coating of liquid digest, at least during the period extending from about nine (9) days to about twenty-two (22) days following weaning.

In this example, one hundred twenty (120) newly-weaned pigs (i.e., weanling) that were 19 days old, on average, and had an average body weight of 13.5 pounds at weaning were subjected to a twenty-two (22) day feeding experiment. One purpose of this example was to evaluate the effectiveness of two different forms of liquid digest for improving the performance of young pigs. Liquid digest for dogs like that used in Examples 1–5 was employed in this example, and liquid ocean fish digest was also employed in this example.

All one hundred twenty pigs in this example were initially fed a commercial Phase 1 diet for the first 8 days following weaning (day 0 through day 8). Then during Phase 2 of this example, the digest feeding trials were conducted. Phase 2 of this example extended from day 9 (9 days after weaning) to day 22 (22 days after weaning). In Trial A of Phase 2, forty of the one hundred twenty test pigs were fed the control feed. In Trial B of Phase 2, another forty of the one hundred test pigs were fed the control feed that had been coated with the liquid digest for dogs. In Trial C of Phase 2, another forty of the test pigs were fed the control feed that had been coated with the liquid ocean fish digest. The same control feed was used in Trial A, Trial B, and Trial C.

Twenty-four pens that could house five pigs each were included in a conventional heated pig nursery. The nursery was maintained at 85° F. during the first week (days 0–7) of this example, and was decreased by 3° F. each week thereafter, starting with day 8 of this example. Each of the twenty-four pens had wire flooring, a nipple water drinker, and a three-hole feeder. The pigs in each pen had ad libitum access to feed and water. The three hole feeders were included in each pen to insure that each of the pigs in each pen had ready access to the particular feed included in the different pens during Phase 1 and Phase 2 of this example.

Eight of the twenty-four pens were assigned to participate in Trial A of Phase 2, another eight of the twenty-four pens were assigned to participate in Trial B of Phase 2, and the last eight of the twenty-four pens were assigned to participate in Trial C of Phase 2. Five pigs were assigned to each of the twenty-four different pens via a randomized complete block design. The pigs were blocked based upon their weight at weaning. After being blocked by weaning weight, the one hundred twenty pigs were randomly allotted to either the eight pens of Trial A, the eight pens of Trial B, or the eight pens of Trial C.

In Trial A of phase 2, from day 9 through day 22 of this example, each of the five pigs in each of the eight different pens of Trial A had equal access to the control feed, where the control feed did not include any digest. The control feed in Trial A was in pellet form.

In Trial B of Phase 2, from day 9 through day 22 of this example, each of the five pigs in each of the eight different pens of Trial B had equal access to the control feed coated with the liquid digest for dogs. In Trial B, the liquid digest for dogs was sprayed onto the control feed at the rate of about two pounds of the liquid digest for dogs per one hundred (100) pounds of the control feed using a conventional hand operated sprayer. The control feed in Trial B was in pellet form. The liquid digest for dogs (product code no. 040120) was obtained from American Dehydrated Foods, Inc. of Springfield, Mo. Prior to applying the liquid digest for dogs to the control feed, the liquid digest for dogs was heated to a temperature ranging from about 100° F. to about 120° F.

In Trial C of Phase 2, from day 9 through day 22 of this example, each of the five pigs in each of the eight different pens of Trial C had equal access to the control feed coated with the liquid ocean fish digest. In Trial C, the liquid ocean fish digest was sprayed onto the control feed at the rate of about two pounds of the liquid ocean fish digest per one hundred (100) pounds of the control feed using a conventional hand operated sprayer. The control feed in Trial C was in pellet form. The liquid ocean fish digest (product code no. 050420) was also obtained from American Dehydrated Foods, Inc. Prior to applying the liquid ocean fish digest to the control feed, the liquid ocean fish digest was heated to a temperature ranging from about 100° F. to about 120° F.

In Trial A, Trial B, and Trial C, the collective weight of the young pigs in each pen (5 pigs per pen) was periodically measured and recorded, by pen. The average weight of the forty pigs of Trial A, the forty pigs of Trial B, and the forty pigs of Trial C, on Day 0 and on Day 8 of Phase I and on Day 15 and on Day 22 of Phase 2, was calculated from this pen-based average pig weight data. These pen-based average pig weights for the pigs of Trial A, Trial B, and Trial C are provided in Table 10 below.

In Trial A, Trial B, and Trial C, the collective feed consumption of the young pigs in each pen (5 pigs per pen) was periodically measured and recorded, by pen. Also, the average daily feed intake of the young pigs in each pen (5 pigs per pen) was determined and recorded, by pen, for the following different periods of this example: Day 0 through Day 8, Day 9 through Day 15; Day 16 through Day 22, and Day 9 through Day 22. Next, the average daily weight gain of the young pigs in each pen (5 pigs per pen) was determined and recorded, by pen, for the following different periods of this example: Day 0 through Day 8, Day 9 through Day 15; Day 16 through Day 22, and Day 9 through Day 22. Additionally, the average feed consumption to weight gain ratio for the young pigs in each pen (5 pigs per pen) was calculated and recorded, by pen, for the following different periods of this example: Day 0 through Day 8, Day 9 through Day 15; Day 16 through Day 22, and Day 9 through Day 22.

The mean daily feed intake for the young pigs of Trial A, Trial B, and Trial C was determined for the following different periods of this example: Day 0 through Day 8, Day 9 through Day 15; Day 16 through Day 22, and Day 9 through Day 22. These mean daily feed intake values were derived from the average daily feed consumption intake data recorded, by pen, for the young pigs of Trial A, Trial B, and Trial C. The mean daily weight gain for the young pigs of Trial A, Trial B, and Trial C was determined for the following different periods of this example: Day 0 through Day 8, Day 9 through Day 15; Day 16 through Day 22, and Day 9 through Day 22. These mean daily weight gain values were derived from the average daily weight gain data recorded, by pen, for the young pigs of Trial A, Trial B, and Trial C.

Finally, the mean feed consumption to weight gain ratio for the young pigs of Trial A, Trial B, and Trial C was determined for the following different periods of this example: Day 0 through Day 8, Day 9 through Day 15; Day 16 through Day 22, and Day 9 through Day 22. These mean feed consumption to weight gain ratios were derived from the average mean feed consumption to weight gain ratio data recorded, by pen, for the young pigs of Trial A, Trial B, and Trial C. This mean daily feed intake data, mean daily weight gain data, and mean feed consumption to weight gain ratio data for the young pigs of Trial A, Trial B, and Trial C is tabulated in Table 10:

TABLE 10

Effect of Liquid Digests on Performance of Weanling Pigs[a]

| VARIABLE | CONTROL FEED ONLY TRIAL A | LIQUID DIGEST FOR DOGS TRIAL B | LIQUID OCEAN FISH DIGEST TRIAL C | C.V. |
|---|---|---|---|---|
| Phase 1 (Days 0 to 8) | | | | |
| ADG (lbs) | .407 | .403 | .413 | 17.9 |
| ADFI (lbs) | .456 | .452 | .472 | 10.8 |
| Feed:gain (weight basis) | 1.125 | 1.125 | 1.165 | 8.93 |
| Phase 2; Week 1 (Days 9–15) | | | | |
| ADG (lbs)[d] | .574[b] | .646[c] | .606[b] | 13.55 |
| ADFI (lbs) | .832 | .845 | .832 | 11.88 |
| Feed:gain (weight basis) | 1.434[d] | 1.320[e] | 1.376[de] | 6.59 |
| Phase 2; Week 2 (Days 16–22) | | | | |
| ADG (lbs) | 1.003[d] | 1.009[d] | 1.109[e] | 8.5 |
| ADFI (lbs) | 1.363 | 1.375 | 1.446 | 8.9 |
| Feed:gain (weight basis) | 1.359 | 1.367 | 1.307 | 6.2 |
| Phase 2 Overall (Days 9 to 22) | | | | |
| ADG (lbs) | .789[b] | .828[bc] | .857[c] | 8.1 |
| ADFI (lbs) | 1.097 | 1.110 | 1.139 | 9.2 |
| Feed:gain (weight basis) | 1.387[b] | 1.345[bc] | 1.328[c] | 4.9 |
| Pig Weight on Day 0 (lbs) | 13.59 | 13.58 | 13.57 | .12 |

TABLE 10-continued

Effect of Liquid Digests on Performance of Weanling Pigs[a]

| VARIABLE | CONTROL FEED ONLY TRIAL A | LIQUID DIGEST FOR DOGS TRIAL B | LIQUID OCEAN FISH DIGEST TRIAL C | C.V. |
|---|---|---|---|---|
| Pig Weight on Day 8 (lbs) | 16.85 | 16.80 | 16.87 | 3.43 |
| Pig Weight on Day 15 (lbs) | 20.87 | 21.32 | 21.11 | 4.03 |
| Pig Weight on Day 22 (lbs) | 27.90 | 28.39 | 28.88 | 4.44 |

[a]Data are means of eight pens of five pigs each, for Trials A, B, and C, respectively.
[bc]Means in the same row with different superscript letter differ by $P < .1$
[de]Means in the same row with different superscript letter differ by $P < .05$ The data of Table 10 demonstrates (P<0.1) that feeding the pigs the control feed coated with the liquid digest for dogs during the first week of Phase 2 caused the pigs of Trial B to gain weight more than 12 percent faster than the pigs of Trial A that were fed only the control feed that was free of digest. These results are consistent with previous findings that spraying the control feed with liquid digest for dogs improved performance of nursery pigs. Also, over the entire two week period of Phase 2, the pigs of Trial B (control feed coated with liquid digest for dogs) gained weight nearly 5 percent faster than the pigs of Trial A that were fed only the control feed that was free of digest.

Consistent with the performance trial of Example 2, during the first week of Phase 2 of this example, the pigs of Trial C that were fed a diet of control feed coated with liquid ocean fish digest exhibited similar weight gain and feed intake, as compared to the pigs of Trial A that were fed the control feed that was free of digest; the pigs had no preference for either feed. However, during the second week of Phase 2 of this example, the pigs of Trial C that were fed the liquid ocean fish digest exhibited greater average weight gain and greater average daily feed intake, as compared to the pigs of Trial A that were fed the control feed that was free of digest.

Specifically, feeding the pigs of Trial C the control feed coated with the liquid ocean fish during the second week of Phase 2 caused the pigs of Trial C to gain weight more than 10 percent faster (P<0.05) than the pigs of Trial A that were fed only the control feed that was free of digest. Also, during the second week of Phase 2, the pigs of Trial C (control feed coated with liquid ocean fish digest) consumed feed at a rate more than 6 percent faster than the pigs of Trial A that were fed only the control feed that was free of digest. This data suggests that young post-weaned pigs may need an initial acclimation period of about a week or so, before the palatability enhancement benefits of the liquid ocean fish digest are realized.

Over the entire two week period of Phase 2, the data of this Example demonstrates that feeding the pigs the control feed coated with the liquid digest for dogs caused the pigs of Trial B to gain weight nearly 5 percent faster than the pigs of Trial A that were fed only the control feed that was free of digest. Also, over the entire two week period of Phase 2, the pigs of Trial B (control feed coated with liquid digest for dogs) were more than 3% more efficient at converting consumed feed to weight gain, as compared to the pigs of Trial A that were fed only the control feed that was free of digest.

Additionally, over the entire two week period of Phase 2, the data of this Example demonstrates (P<0.1) that feeding the pigs the control feed coated with the liquid ocean fish digest caused the pigs of Trial C to gain weight more than 8 percent faster than the pigs of Trial A that were fed only the control feed that was free of digest. Also, over the entire two week period of Phase 2, the pigs of Trial C (control feed coated with liquid ocean fish digest) were more than 4% more efficient at converting consumed feed to weight gain (P<0.1), as compared to the pigs of Trial A that were fed only the control feed that was free of digest.

Thus, over the entire two week experimental period of Phase 2, the pigs fed the Trial B diet with the liquid digest for dogs and the pigs fed the Trial C diet with the liquid ocean fish digest both exhibited greater weight gain and were more efficient at converting feed to weight gain than pigs fed the diet of Trial A that excluded the digest. Surprisingly, at the end of the 22 day experimental period of Phases 1 and 2, the pigs of Trial C that were fed the control feed with liquid ocean fish digest were nearly 1.0 pound heavier than the pigs of Trial A that were fed the control feed that did not include any digest. Clearly, coating the control feed with the liquid ocean fish digest during Phase 2 of this example improved the performance of the nursery pigs of Trial C versus the pigs fed the diet of Trial A that excluded the digest. These results demonstrate that liquid ocean fish digest, like the liquid digest for dogs, is an effective palatability enhancer for young pigs.

Example 7

This example demonstrates the preference of lactating sows for a control feed that includes a coating of natural chicken flavor liquid digest over the control feed that does not include a coating of liquid digest. In this example, six (6) lactating sows that had given birth to piglets about eight days previously were subjected to a ten (10) day feeding experiment. One purpose of this example was to evaluate any preference of the lactating sows for either a control feed that was coated with a liquid digest or the control feed that was free of any digest. The liquid digest in this example was natural chicken flavor liquid digest (product code no. 040520) that was obtained from American Dehydrated Foods, Inc. of Springfield, Mo.

The six sows were individually assigned to six different crates. Each of the six crates included a pair of nipple water drinkers and two one-hole feeders. The two feeders were included in each crate to insure that each of the six sows had free and ready access to both the control feed coated with the natural chicken flavor liquid digest and the control feed free of any digest.

One of the feeders contained the control feed coated with the natural chicken flavor liquid digest, and the other feeder contained the control feed that was free of any digest. Each of the six sows thus had ad libitum access to both (1) the control feed coated with the natural chicken flavor liquid digest and (2) the control feed that was free of any digest. Additionally, each sow had ad libitum access to water. Each feeder was labeled with the feed contained in the particular feeder. The location of each feeder was shifted daily with each particular crate to eliminate any bias that any particular sow may have for feeder location. Additionally, the feed consumption from each feeder was determined daily, on a weight basis, for each crate and thus for each sow.

In this example, the control feed predominantly included a combination of corn and soybean meal. The control feed in this example was thus in meal form. The form of the control feed that included the liquid digest coating was formed by spraying the natural chicken flavor liquid digest onto the control feed at the rate of about two pounds of the natural chicken flavor liquid digest per one hundred (100) pounds of the control feed using a conventional hand operated sprayer. Prior to applying the natural chicken flavor liquid digest to the control feed, the natural chicken flavor liquid digest was heated to a temperature ranging from about 100° F. to about 120° F. Both the (1) control feed coated with the natural chicken flavor liquid digest and the (2) control feed that was free of any digest were formulated to contain 1.00 weight percent lysine to meet or exceed the amino acid requirement estimates of the six sows.

During the 10-day experimental period, each sow consumed more of the control feed sprayed with the natural chicken flavor liquid digest than the control feed that was free of any digest. Data obtained in this example are provided in Table 11 below:

the lactating sows gave birth to piglets (i.e.: shortly after farrowing) and extended to the day the piglets were weaned from the respective sows. One purpose of this example was to evaluate the effectiveness of a liquid digest coating on a control feed for improving the weight and fat retention of the lactating sows. The liquid digest in this example was natural chicken flavor liquid digest (product code no. 040520) that was obtained from American Dehydrated Foods, Inc. of Springfield, Mo.

The forty-seven sows were members of either a first farrowing group of sows or a second farrowing group of sows. The first farrowing group included twenty-three sows that farrowed on or near the same day as each other. The second farrowing group included twenty-four sows that farrowed on or near the same day as each other. The second farrowing group farrowed later than the first farrowing group. The forty-seven sows of the first and second farrowing groups were separated into two trials. Twenty-four of the forty-seven sows were assigned to Trial A and received the control feed that was free of digest. The other twenty-three of the forty-seven sows were assigned to Trial B and received the control feed that was coated with the liquid digest. The lactating sows were assigned to either Trial A or Trial B within 12 hours of farrowing as pairs of sows that had farrowed became available.

As pairs of post-farrowing sows became available, the post-farrow pair was randomly split and assigned, one of the pair to Trial A and the other of the pair to Trial B, to minimize variation in lactation duration between the sows assigned to Trial A and to Trial B. Sow assignment between

TABLE 11

| VARIABLE | VALUE |
| --- | --- |
| No. of sows | 6 |
| Number of days in trial | 10 |
| Number of days between post-farrowing and start of the trial[a] | 7.8 |
| Consumption of Control Feed[a] (pounds per day) | 4.05[b] |
| Consumption of Control Feed coated w/natural chicken flavor liquid digest[a] (pounds per day) | 10.58[c] |

[a]Means of individual averages of six sows.
[b,c]Means in the same row with different superscripts differ by $P < .01$ The results presented in Table 11 demonstrate that the six sows consumed more than 2.5 times (P<0.01), on a daily basis, the amount of the control feed coated with the natural chicken flavor liquid digest, as compared to the amount of the control feed free of any digest that the six sows consumed. Clearly, then, the lactating sows preferred the control feed coated with the natural chicken flavor liquid digest, by a wide margin, over the control feed that was free of any digest.

Example 8

This example demonstrates that lactating sows prefer, and therefore consume more of, the control feed that includes a coating of liquid digest versus the control feed that does not include a coating of liquid digest. This example also demonstrates that lactating sows fed the control feed that includes a coating of liquid digest lose substantially less weight between farrowing and weaning and maintain significantly more backfat between farrowing and weaning, as compared to lactating sows fed the control feed that does not include a coating of liquid digest.

Part A of Example 8

In this example, forty-seven (47) lactating sows were subjected to a feeding experiment that began shortly after Trial A and Trial B did take into account parity (number of litters per sow) to balance parity across Trial A and Trial B; additionally, litter size was equalized for the sows of Trial A and the sows of Trial B, within forty eight hours after farrowing to assure that all sows, whether assigned to Trial A or Trial B, had the same, or about the same, number of nursing piglets. In this regard, if any piglet was transfer to a different sow more than two days after the sows involved in the transfer became part of either Trial A or Trial B, the individual weight of the piglet transferred, along with the identity of the sows involved in the transfer, were recorded at the time of transfer.

The lactating sows were held in individual crates in a conventional farrowing facility. Each crate had wire flooring, a nipple water drinker, and a feeder. The sows in each crate had ad libitum access to water at all times.

The forty-seven lactating sows that were divided between Trial A and Trial B were offered a maximum of four (4) pounds of feed during the first twenty-four (24) hours after farrowing, a maximum of eight (8) pounds of feed during the second day after farrowing, and a maximum of twelve (12) pounds of feed during the third day after farrowing. Thereafter, following the third day after farrowing, the sows were allowed ad libitum access to feed until the piglets were weaned from the lactating sows. The feeders were included in each crate to insure that each lactating sow of Trial A had ready access to the feed used in Trial A and to insure that each lactating sow of Trial B had ready access to the feed used in Trial B.

In Trial A, each of the twenty-four lactating sows had equal access to the control feed, where the control feed did not include any digest. The control feed in Trial A was in meal form. In Trial B, each of the twenty-four lactating sows had equal access to the control feed coated with the natural chicken flavor liquid digest (product code no. 040520). In Trial B, the natural chicken flavor liquid digest was sprayed onto the control feed at the rate of about two pounds of the liquid digest per one hundred (100) pounds of the control feed using a conventional hand operated sprayer. The control feed in Trial B was in meal form. Prior to applying the natural chicken flavor liquid digest to the control feed, the liquid digest was heated to a temperature ranging from about 100° F. to about 120° F.

In Trial A and Trial B, the control feed was the same and consisted of a soybean-corn meal feed of the type conventional fed to lactating sows. Also, the overall feed employed in Trial A (control feed free of any digest) and the overall feed employed in Trial B (control feed coated with the natural chicken flavor liquid digest) were formulated to contain 1.00 weight percent lysine, based upon the total weight of the overall feed, and were also formulated to meet or exceed estimated amino acid requirements of the lactating sows.

In Trial A and Trial B, the feed consumption of each lactating sow was measured and individually recorded daily. Also, the average daily feed intake for each lactating sow was individually calculated and recorded for the following different periods of this example: Day 1 through Day 7; Day 8 through Day 14; Day 1 through Day 14; and Day 1 through the last day of the example for the particular lactating sow (the day the piglets were weaned from the particular lactating sow). The body weight of each lactating sow was also measured and individually recorded on Day 1 (within twelve hours of farrowing), on Day 7 (seven days after farrowing), on Day 14 (fourteen days after farrowing), and additionally on the last day of the example for the particular lactating sow (the day the piglets were weaned from the particular lactating sow). Additionally, the change in body weight of each lactating sow was calculated and individually recorded for the following different periods of this example: Day 1 through Day 7; Day 8 through Day 14; Day 1 through Day 14; and Day 1 through the last day of the example for the particular lactating sow (the day the piglets were weaned from the particular lactating sow).

The mean daily feed intake for the lactating sows of Trial A and for the lactating sows of Trial B was determined for Day 1 through Day 7, Day 8 through Day 14, Day 1 through Day 14, and Day 1 through piglet weaning. These mean daily feed intake values were derived from the average daily feed intake data recorded for each lactating sow. The mean body weight for the lactating sows of Trial A and for the lactating sows of Trial B was determined on Day 1 (within twelve hours of farrowing), Day 7 (seven days after farrowing), Day 14 (fourteen days after farrowing), and additionally on the piglet weaning day. These mean body weight values were derived from the daily weight data recorded for each lactating sow. Additionally, mean body weight change for the lactating sows of Trial A and for the lactating sows of Trial B was determined for Day 1 through Day 7, Day 8 through Day 14, Day 1 through Day 14, and Day 1 through piglet weaning. These mean body weight change values were derived from the body weight change data recorded for each lactating sow. This mean daily feed intake data, mean body weight data, and mean body weight change data for the lactating sows of Trial A and for the lactating sows of Trial B is tabulated in Table 12:

TABLE 12

Effect of Natural Chicken Flavor Liquid Digest on Sow Performance[a]

| VARIABLE | CONTROL FEED WITHOUT ANY DIGEST TRIAL A | CONTROL FEED COATED WITH NATURAL CHICKEN FLAVOR LIQUID DIGEST TRIAL B | P |
|---|---|---|---|
| Number of sows in Trial | 24 | 23 | |
| Mean Parity | 2.92 | 2.75 | 74 |
| Mean Lactation Length At Start of Trial | 20.71 | 20.14 | .43 |
| Mean Sow Daily Feed Intake[a] (lbs) | | | |
| Day 1 to Day 7 | 8.02 | 9.09 | .14 |
| Day 8 to Day 14 | 12.00 | 12.93 | .21 |
| Day 1 to Day 14 | 10.01 | 11.01 | 14 |
| Day 1 to Day of Weaning | 10.92 | 11.81 | .18 |
| Mean Sow Body Weight (lbs) | | | |
| Day 1 (12 hours after farrowing) | 521.23 | 523.03 | 91 |
| Day 7[b] | 515.15 | 525.57 | .16 |
| Day 14[b] | 504.58 | 519.32 | 08 |
| On Day of Weaning[b] | 500.19 | 513.36 | .19 |
| Mean Change[b] in Sow Body Weight (lbs) | | | |
| Day 1 to Day 7 | −7.61 | 2.80 | .16 |
| Day 7 to Day 14 | −10.29 | −5.26 | .23 |
| Day 1 to Day 14 | −17.89 | −3.16 | .08 |
| Day 1 to Day of Weaning | −22.57 | −9.40 | .19 |

[a]Parity was used as covariance.
[b]Parity and sow body weight 12 hours after farrowing were used as covariance.

The results presented in Table 12 demonstrate that for the Day 1 through Day 7 period of this example, the sows of Trial B consumed more than thirteen percent more (P=0.14) of the control feed coated with the natural chicken flavor liquid digest, as compared to the amount of the control feed free of any digest that the sows of Trial A consumed. Additionally, for the Day 1 through Day 14 period of this example, the sows of Trial B consumed about ten percent more (P=0.14) of the control feed coated with the natural chicken flavor liquid digest, as compared to the amount of the control feed free of any digest that the sows of Trial A consumed. Furthermore, for the period extending from Day 1 of this example trough the piglet weaning day, the sows of Trial B consumed more than eight percent more (P=0.18) of the control feed coated with the natural chicken flavor liquid digest, as compared to the amount of the control feed free of any digest that the sows of Trial A consumed.

The results presented in Table 12 also demonstrate that as of Day 7 of this example, the sows of Trial B that were fed the control feed coated with the natural chicken flavor liquid digest weighed more than two percent more (P=0.16) than the sows of Trial A that were fed the control feed free of any digest. Correspondingly, from Day 1 through Day 7 of this example, the sows of Trial B that were fed the control feed coated with the natural chicken flavor liquid digest had a weight gain of more than 0.5 percent (2.80 pounds), while the sows of Trial A that were fed the control feed free of any digest had a weight loss of nearly 1.5 percent (−7.61 pounds), based upon the initial weight of the sows of Trial A and Trial B, respectively, at the start (on day 1) of this example (P=0.16).

The results presented in Table 12 also demonstrate that as of Day 14 of this example, the sows of Trial B that were fed the control feed coated with the natural chicken flavor liquid digest weighed nearly three percent more (P=0.08) than the sows of Trial A that were fed the control feed free of any digest. Correspondingly, from Day 1 through Day 14 of this example, the sows of Trial B that were fed the control feed coated with the natural chicken flavor liquid digest had a weight loss of only about six tenths of one percent (−3.16 pounds), while the sows of Trial A that were fed the control feed free of any digest had a weight loss of about 3.4 weight percent (−17.89 pounds), based upon the initial weight of the sows of Trial A and Trial B, respectively, at the start (on day 1) of this example (P=0.08). Thus, from Day 1 through Day 14 of this example, the sows of Trial A that were fed the control feed free of any digest lost more than four times as much weight as the sows of Trial B that were fed the control feed coated with the natural chicken flavor liquid digest Furthermore, the results presented in Table 12 demonstrate that as of the last day (the piglet weaning day) of this example, the sows of Trial B that were fed the control feed coated with the natural chicken flavor liquid digest weighed more than two and a half percent more (P=0.19) than the sows of Trial A that were fed the control feed free of any digest. Correspondingly, from Day 1 through the last day of this example, the sows of Trial B that were fed the control feed coated with the natural chicken flavor liquid digest had a weight loss of only about 1.8 percent (−9.40 pounds), while the sows of Trial A that were fed the control feed free of any digest had nearly two and a half times more weight loss approaching four and a half percent (−22.57 pounds), based upon the initial weight of the sows of Trial A and Trial B, respectively, at the start (on day 1) of this example (P=0.19).

These results clearly demonstrate that the lactating sows preferred and consumed the control feed coated with the natural chicken flavor liquid digest, by a wide margin, over the control feed that was free of any digest. These results also demonstrate that the lactating sows of Trial B who consumed the control feed coated with the natural chicken flavor liquid digest exhibited far superior weight maintenance during lactation versus the lactating sows of Trial A that consumed the control feed that was free of any digest.

Part B of Example 8

In another aspect of this example, the backfat thickness of twelve of the sows assigned to Trial A and the backfat thickness of eleven of the sows assigned to Trial B was monitored. Collectively, the twenty-three sows of Trial A and Trial B that were selected for this backfat thickness evaluation were each members of the first group of farrowing sows referred to previously in this example.

The backfat thickness for the twelve Trial A sows and the eleven Trial B sows was measured and individually recorded on Day 1 (within twelve hours of farrowing), on Day 14 (fourteen days after farrowing), and additionally on the last day of the example for the particular lactating sow (the day the piglets were weaned from the particular lactating sow). Backfat thicknesses were measured using a Linear Array Ultrasound unit obtained from E.I. Medical of Loveland, Colo.

The mean backfat thickness for these twelve Trial A sows and for these eleven Trial B sows was determined for Day 1 (within twelve hours of farrowing), Day 14 (fourteen days after farrowing), and additionally for the piglet weaning day. These mean backfat thickness values were derived from the daily individual backfat thickness data recorded for the twelve selected Trial A sows and for the eleven selected Trial B sows. The mean backfat thickness results are tabulated in Table 13:

TABLE 13

Effect of Natural Chicken Flavor Liquid Digest on Sow Performance[a]

| VARIABLE | CONTROL FEED WITHOUT ANY DIGEST TRIAL A | CONTROL FEED COATED WITH NATURAL CHICKEN FLAVOR LIQUID DIGEST TRIAL B | P |
|---|---|---|---|
| Number of sows in Trial | 12 | 11 | |
| Mean Parity | 3.08 | 3.00 | .92 |
| Mean Lactation Length At Start of Trial | 21.9 | 21.3 | .40 |
| Sow Backfat, inches[b] | | | |
| Day 1 (12 hours after farrowing) | .52 | .59 | .38 |
| Day 14 | .58 | .67 | .29 |
| On Day of Weaning | .47 | .66 | .10 |

[a]Parity and sow body weight 12 hours after farrowing were used as covariance.
[b]Parity and sow back fat (in inches) 12 hours after farrowing were used as covariance.

The results presented in Table 13 demonstrate that as of the piglet weaning date at the end of this example, the sows of Trial B that were fed the control feed coated with the natural chicken flavor liquid digest had more than forty percent more backfat thickness (P=0.10) than the sows of Trial A that were fed the control feed free of any digest. These backfat maintenance (and enhancement) results further demonstrate how the liquid natural chicken digest that is added to the control feed enhances feed intake by the lactating sows and consequently enhances weight maintenance in lactating sows.

Although the present invention has been described with reference to preferred embodiments, workers skilled in the art will recognize that changes may be made in form and detail without departing from the spirit and scope of the invention.

What is claimed is:

1. A method of feeding young, weaned swine, the method comprising:
   applying a liquid digest onto a feed substance to form a feed material, the liquid digest comprising a poultry based nutritional component enzymatically-processed to a liquified state; and
   providing the feed material to the young, weaned swine.

2. The method of claim 1 wherein an effective amount of the liquid digest is applied onto the feed substance.

3. The method of claim 1 wherein the liquid digest is applied on the feed substance at a rate ranging from about one pound to about three pounds of the liquid digest per one hundred pounds of the feed substance.

4. The method of claim 3 wherein the liquid digest is applied on the feed substance at a rate of about two pounds of the liquid digest per one hundred pounds of the feed substance.

5. The method of claim 1 wherein the liquid digest is heated to a temperature ranging from about 100° F. to about 120°F. prior to being applied onto the feed substance.

6. The method of claim 1 wherein applying the liquid digest onto the feed substance comprises spraying the liquid digest onto the feed substance, brushing the liquid digest onto the feed substance, dipping the feed substance in the liquid digest, tumbling the feed substance with the liquid digest, or any of these in any combination.

7. The method of claim 1 wherein the liquid digest is applied to the feed substance using a hand operated sprayer.

8. The method of claim 1 wherein the poultry based nutritional component comprises enzymatically-processed chicken by-products, enzymatically-processed chicken meat, enzymatically-processed chicken liver or any of these in any combination.

9. The method of claim 1 wherein the feed substance has the form of pellets, chunks, flakes, granules, particles, meal, powder, or any of these in any combination.

10. The method of claim 1 wherein a first group of young, weaned swine, when provided free access to the feed material, gains more weight during a first feeding period than a second group of young, weaned swine that is provided free access to the feed material that is free of the liquid digest.

11. The method of claim 1 wherein a first group of young, weaned swine, when provided free access to the feed material, has a first ratio of weight gained to weight of feed consumed during a first feeding period, and a second group of young, weaned swine that is provided free access to the feed material that is free of the liquid digest has a second ratio of weight gained to weight of feed consumed during the first feeding period, the first ratio of weight gained to weight of feed material consumed being lower than the second ratio of weight gained to weight of feed material consumed.

12. The method of claim 1 wherein a first group of young, weaned swine, when provided free access to the feed material, converts the feed material that is consumed to weight gain more efficiently than a second group of young, weaned swine, when provided with free access to the feed material that is free of the liquid digest, converts the feed material that is free of the liquid digest to weight gain.

13. A method of increasing the palatability of a swine feed, the method comprising applying a liquid digest onto the swine feed, the liquid digest comprising an enzymatically-processed poultry based nutritional component in a liquified state.

14. The method of claim 13 wherein an effective amount of the liquid digest is applied onto the swine feed.

15. The method of claim 13 wherein the liquid digest is applied on the swine feed at a rate ranging from about one pound to about three pounds of the liquid digest per one hundred pounds of the swine feed.

16. The method of claim 15 wherein the liquid digest is applied on the swine feed at a rate of about two pounds of the liquid digest per one hundred pounds of the swine feed.

17. The method of claim 13 wherein the liquid digest is heated to a temperature ranging from about 100° F. to about 120° F. prior to being applied onto the swine feed.

18. The method of claim 13 wherein applying the liquid digest onto the swine feed comprises spraying the liquid digest onto the swine feed, brushing the liquid digest onto the swine feed, dipping the swine feed in the liquid digest, tumbling the swine feed with the liquid digest, or any of these in any combination.

19. The method of claim 13 wherein the liquid digest is applied to the swine feed using a band operated sprayer.

20. The method of claim 13 wherein the enzymatically-processed poultry meat comprises enzymatically-processed chicken by-products, enzymatically-processed chicken meat, or any of these in any combination.

21. The method of claim 13 wherein the swine feed has the form of pellets, chunks, flakes, granules, particles, meal, powder, or any of these in any combination.

22. A method of making a swine feed, the method comprising:
    enzymatically processing a poultry based nutritional component to form a liquid digest;
    applying the liquid digest onto a feed substance to form the swine feed.

23. The method of claim 22 wherein the nutritional component comprises chicken by-products, chicken liver, chicken meat, or any of these in any combination.

24. The method of claim 22 wherein the enzymatic processing is allowed to proceed sufficiently to liquify, or at least essentially liquify, the nutritional component.

25. The method of claim 22 wherein an effective amount of the liquid digest is applied onto the feed substance.

26. The method of claim 22 wherein the liquid digest is applied on the feed substance at a rate ranging from about one pound to about three pounds of the liquid digest per one hundred pounds of the feed substance.

27. The method of claim 22 wherein the liquid digest is heated to a temperature ranging from about 100° F. to about 120° F. prior to being applied onto the feed substance.

28. The method of claim 22 wherein enzymatically processing the poultry based nutritional component comprises autolyzing the poultry based nutritional component.

29. A method of increasing the feed efficiency of a young, post-weaned pig, the method comprising:
    applying a palatability enhancer onto a feed substance to form a feed material, the palatability enhancer comprising a poultry based enzymatically-processed material; and
    providing the feed material to the young, post-weaned pig.

30. The method of claim 29 wherein the palatability enhancer comprises a liquid digest.

31. The method of claim 30 wherein an effective amount of the liquid digest is applied onto the feed substance.

32. The method of claim 30 wherein the liquid digest is applied on the feed substance at a rate ranging from about one pound to about three pounds of the liquid digest per one hundred pounds of the feed substance.

33. The method of claim 30 wherein applying the liquid digest onto the feed substance comprises spraying the liquid digest onto the feed substance, brushing the liquid digest onto the feed substance, dipping the feed substance in the liquid digest, tumbling the feed substance with the liquid digest, or any of these in any combination.

34. A method of increasing the feed intake of a lactating sow, the method comprising:
    applying a liquid digest onto a feed substance to form a feed material, the liquid digest comprising enzymatically-processed poultry based material; and
    providing the feed material to the lactating sow.

35. The method of claim 34 wherein an effective amount of the liquid digest is applied onto the feed substance.

36. The method of claim 34 wherein the liquid digest is applied on the feed substance at a rate ranging from about one pound to about three pounds of the liquid digest per one hundred pounds of the feed substance.

37. The method of claim 34 wherein applying the liquid digest onto the feed substance comprises spraying the liquid digest onto the feed substance, brushing the liquid digest onto the feed substance, dipping the feed substance in the liquid digest, tumbling the feed substance with the liquid digest, or any of these in any combination.

38. The method of claim 34 wherein the feed substance has the form of pellets, chunks, flakes, granules, particles, meal, powder, or any of these in any combination.

39. A method of maintaining the body weight of a lactating sow, the method comprising:

applying a liquid digest onto a feed substance to form a feed material, the liquid digest comprising enzymatically-processed poultry based material; and providing the feed material to the lactating sow.

40. The method of claim 39 wherein an effective amount of the liquid digest is applied onto the feed substance.

41. The method of claim 39 wherein the liquid digest is applied on the feed substance at a rate ranging from about one pound to about three pounds of the liquid digest per one hundred pounds of the feed substance.

42. The method of claim 39 wherein applying the liquid digest onto the feed substance comprises spraying the liquid digest onto the feed substance, brushing the liquid digest onto the feed substance, dipping the feed substance in the liquid digest, tumbling the feed substance with the liquid digest, or any of these in any combination.

43. The method of claim 39 wherein the feed substance has the form of pellets, chunks, flakes, granules, particles, meal, powder, or any of these in any combination.

* * * * *

UNITED STATES PATENT AND TRADEMARK OFFICE
CERTIFICATE OF CORRECTION

PATENT NO. : 6,783,777 B2
DATED : August 31, 2004
INVENTOR(S) : Bill L. Miller et al.

It is certified that error appears in the above-identified patent and that said Letters Patent is hereby corrected as shown below:

Column 17,
Line 41, insert -- . -- before "433";
Line 42, insert -- . -- before "475";
Line 46, insert -- . -- before "630";
Line 47, insert -- . -- before "784";
Line 53, insert -- . -- before "827" and "839";
Line 58, insert -- . -- before "736".

Column 34,
Line 17, insert -- . -- before "74";
Line 25, insert -- . -- before "14";
Line 29, insert -- . -- before "91";
Line 32, insert -- . -- before ".08".

Column 38,
Line 4, delete "band" and insert -- hand --.

Signed and Sealed this

Fourth Day of April, 2006

JON W. DUDAS
*Director of the United States Patent and Trademark Office*